US009049645B2

(12) United States Patent
Wu et al.

(10) Patent No.: US 9,049,645 B2
(45) Date of Patent: Jun. 2, 2015

(54) WAN ASSISTED MONITORING AND COMMUNICATIONS METHODS AND APPARATUS FOR COMMUNICATIONS DEVICES

(75) Inventors: Zhibin Wu, Bedminster, NJ (US); Georgios Tsirtsis, London (GB); Michaela Vanderveen, Tracy, CA (US); Richard Hovey, Branchburg, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 208 days.

(21) Appl. No.: 13/554,866

(22) Filed: Jul. 20, 2012

(65) Prior Publication Data

US 2014/0022986 A1    Jan. 23, 2014

(51) Int. Cl.
*H04W 48/16*    (2009.01)
*H04W 68/02*    (2009.01)
*H04W 8/00*    (2009.01)
*H04W 76/02*    (2009.01)

(52) U.S. Cl.
CPC .............. *H04W 48/16* (2013.01); *H04W 68/02* (2013.01); *H04W 8/005* (2013.01); *H04W 76/023* (2013.01)

(58) Field of Classification Search
None
See application file for complete search history.

(56) References Cited

U.S. PATENT DOCUMENTS

| 7,574,223 | B2 * | 8/2009 | Funato et al. ................. | 455/458 |
| 7,949,358 | B2 * | 5/2011 | Wentink et al. ................ | 455/515 |
| 7,969,954 | B2 * | 6/2011 | Abhishek et al. ............. | 370/338 |
| 2005/0136930 | A1 * | 6/2005 | Dent ............................. | 455/445 |
| 2006/0171332 | A1 * | 8/2006 | Barnum ........................ | 370/254 |
| 2009/0013081 | A1 * | 1/2009 | Laroia et al. .................. | 709/228 |
| 2009/0017843 | A1 * | 1/2009 | Laroia et al. .................. | 455/458 |
| 2009/0285119 | A1 * | 11/2009 | Horn et al. ................... | 370/254 |
| 2009/0327391 | A1 * | 12/2009 | Park et al. .................... | 709/201 |
| 2009/0327395 | A1 * | 12/2009 | Park et al. .................... | 709/202 |
| 2010/0081459 | A1 * | 4/2010 | Bosch et al. .................. | 455/458 |

(Continued)

FOREIGN PATENT DOCUMENTS

| EP | 1333627 A1 | 8/2003 |
| WO | WO-09136844 | 11/2009 |
| WO | WO-2012050491 A1 | 4/2012 |

OTHER PUBLICATIONS

International Search Report and Written Opinion—PCT/US2013/050813—ISA/EPO—Oct. 24, 2013.

*Primary Examiner* — Ian N Moore
*Assistant Examiner* — Lakeram Jangbahadur
(74) *Attorney, Agent, or Firm* — James K. O'Hare

(57) ABSTRACT

Methods and apparatus for improved monitoring and tracking of communications devices, e.g., peer to peer devices, using assistance from WAN elements such as base stations, are described. In some embodiments, a wireless terminal requests peer to peer communications discovery assistance from one or more base stations. In some embodiments, the request includes information identifying peer communications discovery information the wireless terminal is seeking to detect. In some embodiments, upon receiving the request, nearby base stations listen to the common discovery channel and upon detecting the specified discovery information, send a response indicating the detection of the discovery information and a proximate location of the announcing peer device, to the wireless terminal. The wireless terminal can use the received information to locate and page the announcing peer via the base station serving the announcing peer. Location tracking of peer devices is facilitated and peer-to-peer communication setup time may be reduced.

20 Claims, 9 Drawing Sheets

(56) References Cited

U.S. PATENT DOCUMENTS

| | | |
|---|---|---|
| 2010/0118834 A1 | 5/2010 | Kalhan |
| 2010/0254308 A1* | 10/2010 | Laroia et al. ............... 370/328 |
| 2011/0053617 A1 | 3/2011 | Lee et al. |
| 2011/0058542 A1 | 3/2011 | Nylander et al. |
| 2011/0082940 A1* | 4/2011 | Montemurro et al. ........ 709/227 |
| 2011/0098043 A1* | 4/2011 | Yu et al. ..................... 455/435.1 |
| 2011/0106837 A1* | 5/2011 | Walton et al. ............... 707/769 |
| 2011/0161697 A1* | 6/2011 | Qi et al. ....................... 713/320 |
| 2011/0200072 A1* | 8/2011 | Hong et al. .................. 375/130 |
| 2011/0238794 A1* | 9/2011 | Wu et al. ..................... 709/220 |
| 2011/0258313 A1* | 10/2011 | Mallik et al. ................ 709/224 |
| 2011/0294474 A1* | 12/2011 | Barany et al. ............... 455/414.1 |
| 2013/0203415 A1 | 8/2013 | ARVIDSSON; Aake et al. |
| 2013/0229944 A1* | 9/2013 | Montemurro et al. ........ 370/254 |
| 2013/0281146 A1* | 10/2013 | Walton et al. ............... 455/515 |
| 2014/0022986 A1* | 1/2014 | Wu et al. ..................... 370/328 |
| 2014/0024378 A1 | 1/2014 | Khude et al. |

* cited by examiner

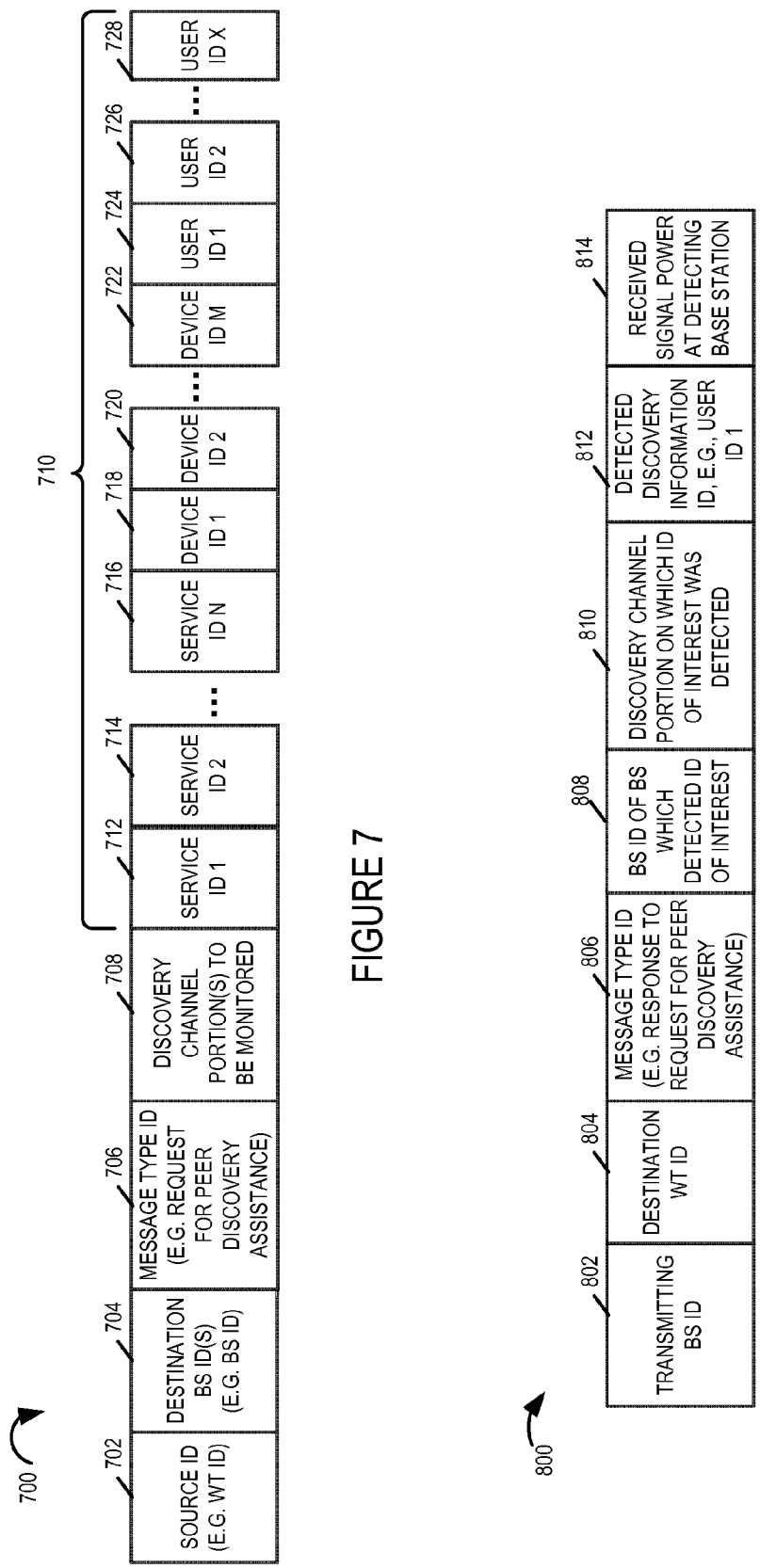

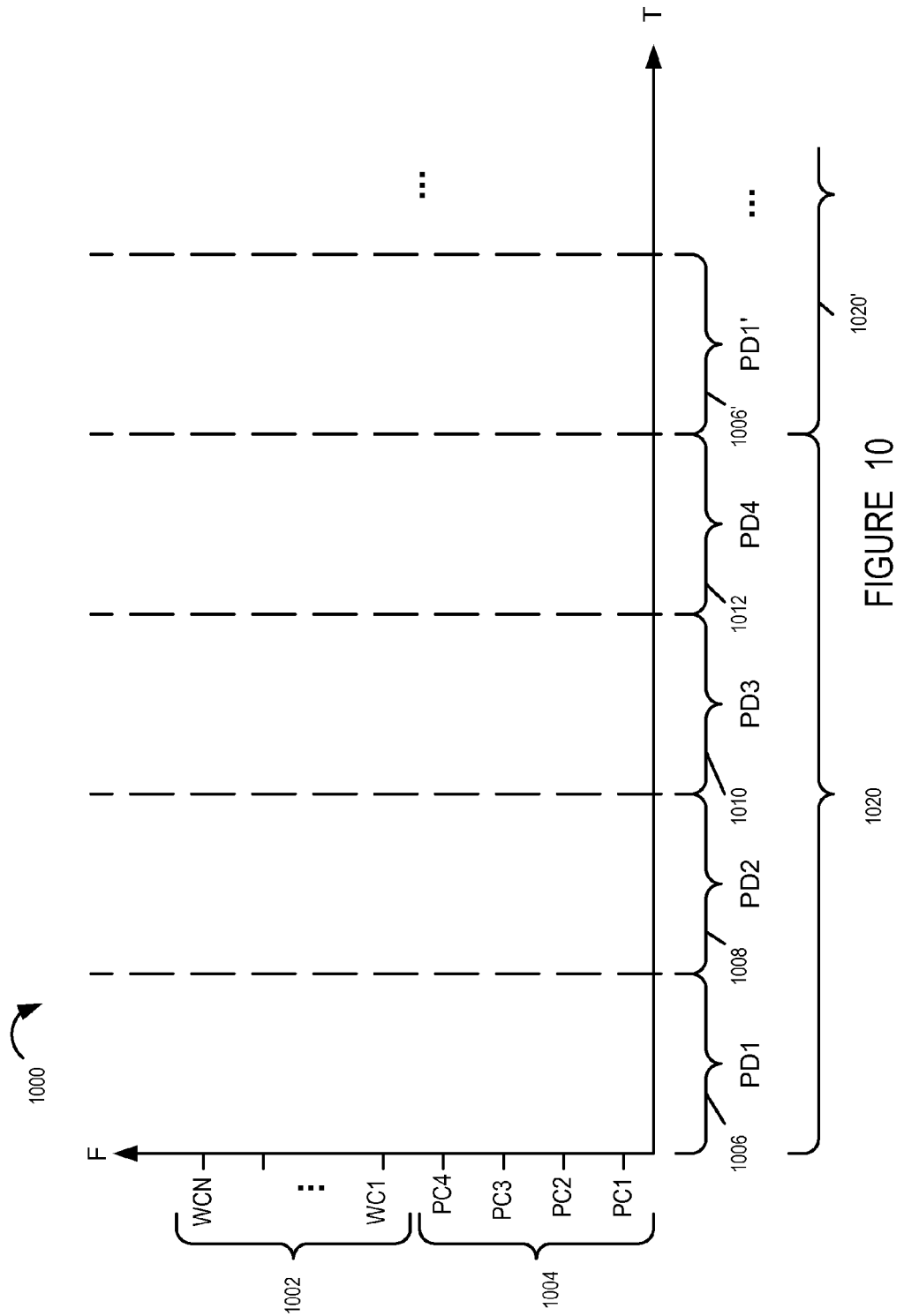

WAN ASSISTED MONITORING AND COMMUNICATIONS METHODS AND APPARATUS FOR COMMUNICATIONS DEVICES

FIELD

Various embodiments relate to wireless communications methods and apparatus and, more particularly, to wireless communications methods and apparatus that facilitate infrastructure, e.g., base station, assisted peer to peer discovery operations, e.g., detection of peer to peer discovery signals on behalf of a peer to peer capable device.

BACKGROUND

LTE, which stands for Long Term Evolution, is based on standards developed by the $3^{rd}$ Generation Partnership Project (3GPP). LTE compliant systems allow peer to peer devices, e.g., LTE peer user equipment devices (UEs), to discover each other's application or service identifier announcements via listening to a common discovery channel. When the distance between the two UE's becomes larger than a certain range, or when the radio propagation between the UE that is announcing discovery information, sometimes referred to as the announcing UE, and the monitoring UE that is monitoring and seeks to detect the discovery information fades due to adverse channel conditions, the monitoring UE will loose track of the announcing UE.

Without the knowledge of the location of the announcing UE it is difficult to reach out to the infrastructure base station (eNodeB) serving the announcing UE. This is because in current LTE systems, infrastructure/system does not track the announcing UE's service/application identifiers. Thus, the monitoring UE, and its serving eNodeB are unable to determine the right route/path through eNodeBs to reach the announcing UE, although the announcing UE may be within the proximity of the monitoring UE.

UE's could be required to routinely provide, via WAN signaling, information to an infrastructure element about service/application identifiers the UE is advertising for peer to peer purposes so that the LTE infrastructure is aware of the location of the various UEs and the service/application identifiers they are advertising thereby making such information readily available to the infrastructure elements should a UE request such information from an infrastructure element. However, such an approach requires the UEs to frequently stay out of "idle" mode and frequently bring up an LTE WAN connection to update the information, which impacts the battery life of the UEs negatively. Accordingly, it should be appreciated that requiring UEs to register, via a WAN connection, information about the application and/or service identifiers they are advertising over a peer to peer, e.g., direct device to device, channel can be undesirable from a power consumption standpoint as well as from the standpoint of consuming WAN communications resources that might be used by other devices to communicate data over the WAN.

In view of the above discussion, it should be appreciated that there is a need for methods and apparatus which allow for an infrastructure element such as a base station to assist in peer discovery without requiring advertising peer to peer devices to register the identifiers to be advertised with an infrastructure element.

SUMMARY

Methods and apparatus that facilitate infrastructure, e.g., base station, assisted peer to peer discovery operations, e.g., detection of peer to peer discovery signals on behalf of a peer to peer capable device.

Methods and apparatus for improved monitoring and/or tracking of peer to peer communications devices and discovery information transmitted, e.g., advertised, by such devices on a peer discovery channel are described.

In various embodiments, a wireless terminal, e.g., a UE, informs an infrastructure element, e.g., a base station such as an eNodeB, of various peer discovery information it is seeking to detect. The wireless terminal does this, in some embodiments, by sending the base station serving as the wireless terminals network point of attachment a message, via a wide area network uplink communications channel, requesting peer to peer communications discovery assistance. The request message may include, e.g., information identifying the requesting wireless terminal, information indicating the peer to peer discovery channel or channels to be monitored and what portion of the channel or channels to be monitored. The request message also includes one or more expressions the wireless terminal seeks to discover. The expressions maybe, e.g., a peer device identifier, a service identifier and/or a user identifier. A service identifier indicates, e.g., a service being offered by a device. Service identifiers are sometimes referred to as service discovery information since they provide information which allows a peer to peer device to discover a service available via another peer device. Device identifiers and/or user identifiers are sometimes referred to as peer device discovery information since they provide information about a peer device and/or a user of a peer device.

A base station that receives a request for peer to peer discovery assistance, e.g, the serving base station, stores the information included in the request such as the discovery channel portions to be monitored, the expressions which are to be detected and the identifier of the device seeking the discovery assistance. The base station then proceeds to monitor the indicated peer to peer discovery channel potion or portions to detect the requested identifiers. The base station which received the request may also forward it to neighboring base stations which, like the base station which received the request, will monitor the indicated peer to peer channel portion or portions in an attempt to detect the discovery information of interest, e.g., identifiers indicated in the request message, on the channel.

A base station which detects an identifier or other discovery information that was to be monitored, measures the signal strength of the signal communicating the detected information. The base station detecting discovery information of interest sends a message back to the wireless terminal, e.g., over a WAN communications channel, indicating detection of information of interest, the information, e.g., identifier or identifiers which were detected, and the received signal strength of the signal communicating the information of interest which was detected. The information may be sent in the form of a unicast message to the wireless terminal which requested the peer to peer discovery assistance. The message may be transmitted directly from the detecting base station to the wireless terminal but may also be communicated through the base station serving as the wireless terminal's network point of attachment when the detection operation is performed by a base station other than the wireless terminal's serving base station. The message providing the detection information may identify the base station which detected the particular indicated identifier.

In some embodiments, the serving base station combines information from multiple nearby base stations which detected information of interest and sends the detection information in a single message to the wireless terminal In at least some such embodiments, individual information is provided identifying the particular individual base stations which detected information of interest and the corresponding received signal strength.

Using the information about which base station or base stations detected the peer to peer discovery information of interest, a wireless terminal can determine the location of a peer wireless terminal of interest within the system and also have some idea of the discovery information it has been broadcasting even though the signals may not be able to be received directly by the wireless terminal which issued the request for peer to peer discovery assistance.

The base stations which monitor one or more peer to peer channels do not, in some embodiments, monitor such channels absent a request for assistance. However, in some other embodiments the base stations may monitor the peer to peer communications channels.

The methods and apparatus of the present invention allow a peer to peer device to obtain peer to peer discovery assistance from one or more base stations without the need for the device transmitting peer discovery information to interact with the base stations on WAN channels.

In some but not necessarily all embodiments the use of WAN channels for receiving peer to peer discovery assistance requests, e.g, snooping requests, and the transmission of peer discovery detection results allow a base station to provide peer to peer discovery assistance to a wireless terminal, capable of supporting both peer to peer communications and WAN network communications involving infrastructure devices, without requiring infrastructure elements to transmit on peer to peer communications channels.

Thus in various embodiments a communications device, e.g., a monitoring UE, can request assistance from a base satiation, e.g., an eNodeB, to enhance expression monitoring capability. This approach does not require extra transmissions in the common discovery channel used for direct device to device discovery.

Various features in some but not necessarily all exemplary embodiments are particularly well suited for use with LTE. Some, but not necessarily all, exemplary embodiments improve reliability of discovery using an LTE-Direct discovery channel by extending the monitoring function performed on behalf of a requesting UE to include surrounding base stations (eNodeB's), as well as the base station directly serving the requesting UE. Thus in accordance with one feature of some embodiments, nearby eNodeBs snoop (listen to) the common discovery channel in response to a monitoring UE's request. In this way, one or more base stations (eNodeBs) close to the announcing UE may be able to discover the announcing UE that transmitted the peer to peer discovery information. In accordance with one feature of some embodiments the base stations detecting the specified discovery information send a response indicating the detection of said peer to peer communications discovery information to the monitoring UE and/or the base station serving the monitoring UE.

The monitoring UE can invoke this procedure one or multiple times to keep tracking a device and/or the expressions it transmits, based on the discovery information the device transmits on the discovery channel. The expressions transmitted by the device may be application expressions, service expressions, device identifier expressions, etc. Base stations (eNodeBs) can detect the expressions transmitted by the announcing UE, even when the announcing UE is out of the direct discovery range of the monitoring UE. In some embodiments, the communications device which requested the monitoring, e.g., snooping of the discovery channel or channels by one or more base stations, can use the information received in response to the request, e.g., from one or more base stations, to improve location accuracy of its peers. For example, the requesting UE or another device in the system may be able to estimate and/or determine the location of the UE being tracked from the peer discovery (PD) signal strength measured and reported by the base stations in the response message. This information can, and in some embodiments is, used by the requesting UE to determine which base station a page request should be sent when trying to reach the UE being monitored. After paging and establishment of a directed communications channel between the requesting UE and paged/monitored UE, the requesting UE and paged UE can communicate directly over a direct device to device communications channel. The feature which allows for identifying which base station through which a UE can be pages has the potential to reduce the peer-to-peer communication setup time e.g., by determining based on the response, the particular base station through which the first communication device can reach the announcing UE and thereby eliminating or reducing the need to page through multiple base stations or try different base stations sequentially.

One exemplary method of operating a first wireless terminal, e.g., user equipment (UE), includes operating the first wireless terminal to send a request via a wide area network uplink communications channel to a first base station (e.g., an eNodeB) requesting peer to peer communications discovery assistance, said request including information identifying peer to peer communications discovery information the wireless terminal is seeking to detect and receive, via a wide area network downlink communications channel, from a responding base station, a response to said request indicating the detection of said peer to peer communications discovery information.

An exemplary first wireless terminal, e.g., UE, comprises at least one processor configured to: send a request via a wide area network uplink communications channel to a first base station requesting peer to peer communications discovery assistance, said request including information identifying peer to peer communications discovery information the first communications device is seeking to detect; and receive, via a wide area network downlink communications channel, from a responding base station, a response to said request indicating the detection of said peer to peer communications discovery information. The first communications device may, and in some embodiments does, include a memory coupled to the at least one processor.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE FIGURES

FIG. 7 illustrates an exemplary peer to peer discovery assistance request message, e.g., communicated from a monitoring wireless terminal to one or more base stations, in accordance with an exemplary embodiment that may be used in any one of the systems shown in FIGS. 1-3.

FIG. 8 illustrates an exemplary peer to peer discovery assistance request response message, e.g., communicated from a base station and directed to a monitoring wireless terminal, in accordance with an exemplary embodiment that can be used in any one of the systems shown in FIGS. 1-3.

FIG. 10 illustrates an exemplary allocation of frequencies to wide area network communications channels and direct peer to peer communications channels in the context of a recurring timing structure which includes multiple peer discovery intervals during which a base station may perform monitoring in response to a request from a UE.

DETAILED DESCRIPTION

Figure 1:
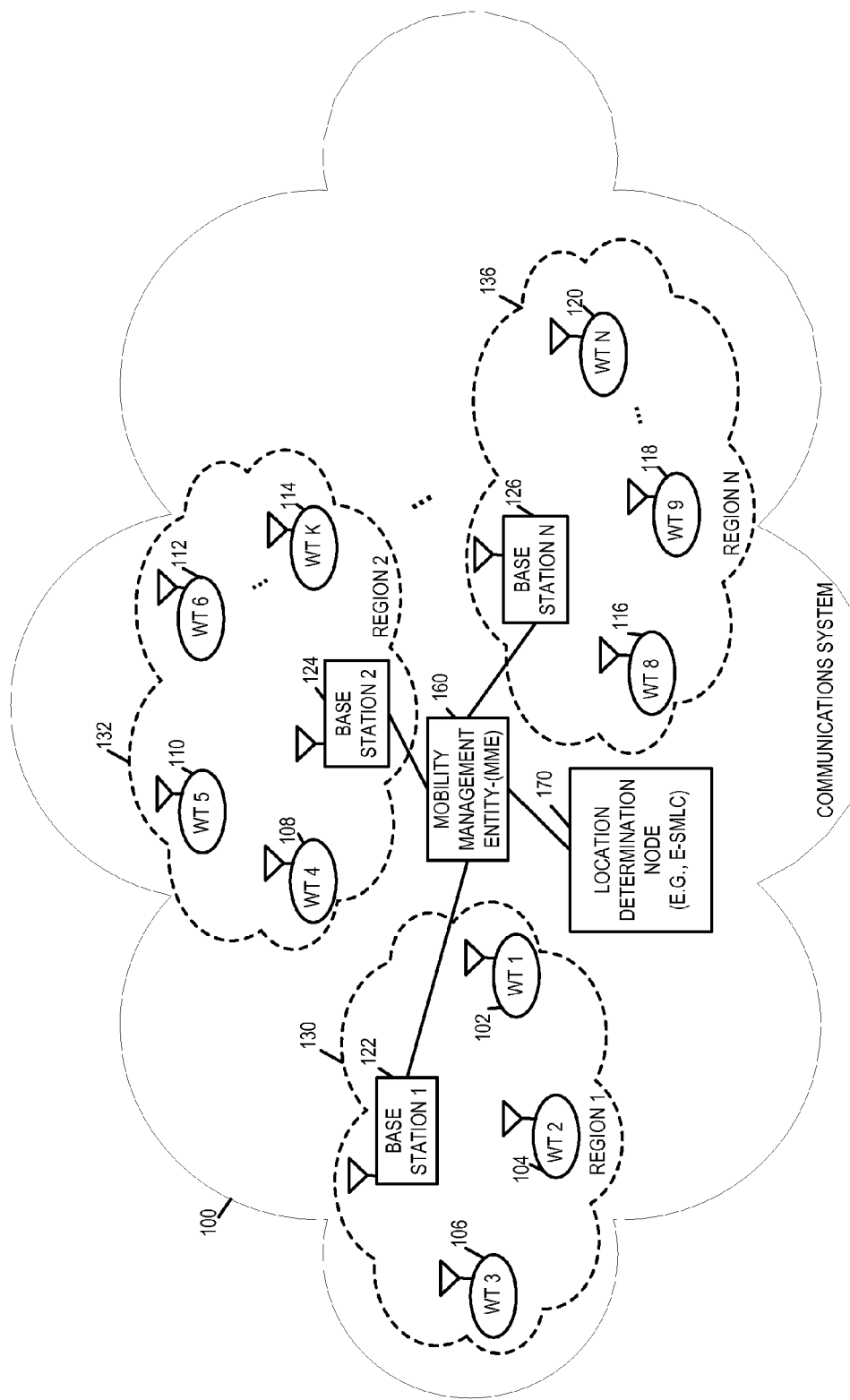
FIG. 1 illustrates an exemplary wireless communications system implemented in accordance with one exemplary embodiment.

FIG. 1 illustrates a communications system 100 that includes a plurality of different regions 130, 132, . . . 136. Each region 130, 132, 136 includes a base station (122, 124 or 126) which serves as an attachment for the wireless terminals (WTs) (e.g., User Equipment devices (UEs)) in the region. In the illustrated example, region 130 includes WT 1 102, WT 2 104 and WT 3 106 served by base station 122, region 132 includes WT 4 108, WT 5 110, WT 6 112, . . . , WT K 114 and the serving base station 124, and region 136 includes WT 8 116, WT 9 118, . . . , WT N 120 and the serving base station 126. The base stations 122, 124, 126 may, and in some embodiments are, implemented as eNodeBs. However, other base station embodiments are also possible. In addition to the base stations and the wireless terminal, system 100 further includes a mobility management entity (MME) device 160 coupled to the base stations 122, 124, 126 as shown in the figure and a location determination node 170. The MME device 160 includes multiple MME modules, e.g., one for each wireless terminal (UE) served by the MME 160. The location determination node maybe, and in some embodiments is, implemented as an Enhanced Serving Mobile Location Centre (E-SMLC) which may, and in some embodiments does, determine the location of UEs from the signal strength of peer discovery signals detected by base stations which detect signals which are monitored in response to one or more UE requests. The signal strength information may, and in some embodiments is, communicated to the location determination node 170 by a serving base station with the serving base station then reporting the location, e.g., base station closest to the UE from which expressions were detected, to the requesting UE in place of the signal strength information shown in the messages 800, 900 of FIGS. 8 and 9. The base stations 122, 124, 126 exchange signaling and information with the MME device 160 to provide communications services to the wireless terminals being served by the base stations in the system 100. While a single MME 160 and location determination node 170 are shown in FIG. 1, it should be appreciated that the system 100 may include multiple MMEs and location determination nodes.

The wireless terminals shown in FIG. 1 support Wide Area Network (WAN) communication, e.g., cellular network communication using infrastructure elements such as base stations 122, 124, 126 but also support peer to peer communications, e.g., direct device to device communications.

In the FIG. 1 system, various wireless communications devices may be operating in different geographic regions at a given point in time. A wireless terminal's location may change from time to time as the device moves throughout the system 100. The communications devices, e.g., wireless terminals, in the system 100 can communicate with other wireless terminals either directly, e.g., in a peer to peer manner, or via one or more base stations, e.g., using WAN communications channels and an infrastructure element such as a base station to communicate information. In various embodiments, the base stations and/or location determination node 170 keep track of the locations of the wireless terminals being served by a base station or which are using direct device to device communications channels but are being monitored by a base station in terms of peer discovery broadcasts in response to a request from a wireless terminal.

Various base stations and/or the other infrastructure elements such as MME 160 and location determination node 170, in some embodiments, are coupled via backhaul links, to one another and/or other infrastructure nodes for exchanging information.

In the system 100, various devices discover each other's discovery information, e.g., device identifier, service identifier, application identifier, etc., by monitoring a common discovery channel, e.g., a peer to peer discovery channel, where the various devices performing peer to peer communications and/or supporting peer to peer communications in the system announce/advertise their respective discovery information. The peer discovery channel may be one of a plurality of channels in the system used for peer to peer, e.g., directed device to device, communication.

Consider for example FIG. 10 which is a frequency (x axis) and time (y axis) diagram 1000 that shows a plurality of peer to peer communications channels (PC1, PC2, PC3, PC4) 1004 corresponding to different frequencies. PC1 may be, e.g, a peer to peer discovery broadcast channel over which devices may transmit expressions, e.g., identifiers, identifying a device transmitting the expression or indicating a service which can be provided by the device or an application supported by the transmitting device. The broadcast of discovery information by devices supporting peer to peer communication may be controlled and/or otherwise synchronized based on a recurring timing structure 1020, 1020' with e.g., an individual device using the same portion of the recurring timing structure over a period of time, e.g., as it moves from one region 130 of the system 100 to another region 132. For example, WT 102 may use the first portion PD1 1006, 1006' of each recurring peer discovery interval 1020, 1020' with the other portions PD2, PD3, PD4 1008, 1010, 1012 being used by other WTs for peer discovery announcements.

Peer communications channels PC2, PC3, PC4 may be, and in some embodiments are, different device to device channels which can be used for direct peer to peer communications, e.g., peer to peer data channels. Wide area network channels 1002 are used for communication between a wireless terminal or other device and an infrastructure element such as a base station. Control signaling and/or wide area network data communications between a base station and wireless terminal go over one or more of the wide area network communications channels 1002. Using the wide area network communications channels, a wireless terminal can establish and be assigned communications resources for a direct device to device communication channel sometimes referred to as bearer channels (e.g., channels PC2, PC3, or PC4). A device to device bearer channel can be used to directly communicate voice and/or data traffic between wireless terminals without the communication passing through an infrastructure element. Thus, once a bearer channel is established for peer to peer communications, two devices can directly communicate over the bearer channel. Alternatively rather than using direct device to device communication, communication can be established through one or more infrastructure elements, e.g., communication can and sometimes is conducted through base stations when UEs are too far apart for direct device to device communication or when a base station or network controller determines that for interference purposes it is preferable that devices communicate through one or more base stations rather than through a direct device to device communication link. Direct device to device communication may be desirable when two devices are close together, e.g., allowing direct device to device communication to proceed with the use of lower power than might be required for UE transmission if communication through a base station was used. Thus, in some embodiment direct device to device communication is used when UEs seeking to communicate are in close proximity to each other but not when they are far apart, e.g., located in non-adjacent cells of the WAN.

Returning to the discussion of the system 100, in some embodiments the discovery information transmitted on the discovery channel is in the form of expressions, e.g., bit sequences mapped to a UE device, a peer user, a peer application, a peer service, a peer network, a search request, or to a specified taxonomy of identifiers. For example, a first expression in the form of a first bit sequence may identify a first wireless terminal while a second expression in the form of a second bit sequence that is different from the first bit sequence may identify a second wireless terminal. The expressions are identifiers used to identify a user, device, service, group of users, etc. or some other information which may be of interest.

The discovery usually happens directly between a pair of communications devices, e.g., wireless terminals with one wireless terminal hearing and detecting the expression transmitted by the other wireless terminal. The wireless terminal detecting an expression of interest may respond to the wireless terminal transmitting the expression by establishing communication with the transmitting device, seeking to obtain a service corresponding to the advertised expression from the transmitting device and/or taking some other action based on the detection of an expression.

As should be appreciated, when the distance between two wireless terminals becomes larger than a certain range, or when the radio propagation between an announcing wireless terminal (UE) and a monitoring wireless terminal (UE) fades due to adverse channel conditions, the monitoring UE may loose track of an announcing UE with which it previously received an expression of interest over a discovery channel.

In accordance with various aspects, WAN assistance of peer discovery signals is provided to improve proximity services, by increasing discovery range, improving UE power efficiency during peer to peer (also referred to as device to device or D2D) operations, aggregating/minimizing redundant D2D and WAN signaling and/or to allow for other optimizations.

In some embodiments, a monitoring UE, e.g., WT102, requests peer to peer communications discovery assistance from one or more base stations, e.g., such as BS 122, 126. The monitoring UE may send the request to a base station serving the monitoring UE or to a plurality of neighboring base stations within range of the monitoring UE. In some embodiments, the request includes information identifying peer to peer communications discovery information the monitoring UE 102 is seeking to detect, e.g., discovery information corresponding to a peer device such as WT 2 104 or another wireless terminal. In some embodiments, upon receiving the request, nearby base stations listen to the common discovery channel and upon detecting the discovery information specified by the monitoring UE, send a response indicating the detection of the discovery information and an approximate location of the peer device announcing the discovery information to the monitoring UE 102 or to the base station serving the monitoring UE 102.

In some, but not necessarily all, embodiments, one or more or wireless terminals (UEs) are implemented as portable communications devices such as handheld cell phones or portable personal data assistant (PDA) devices.

Figure 2:
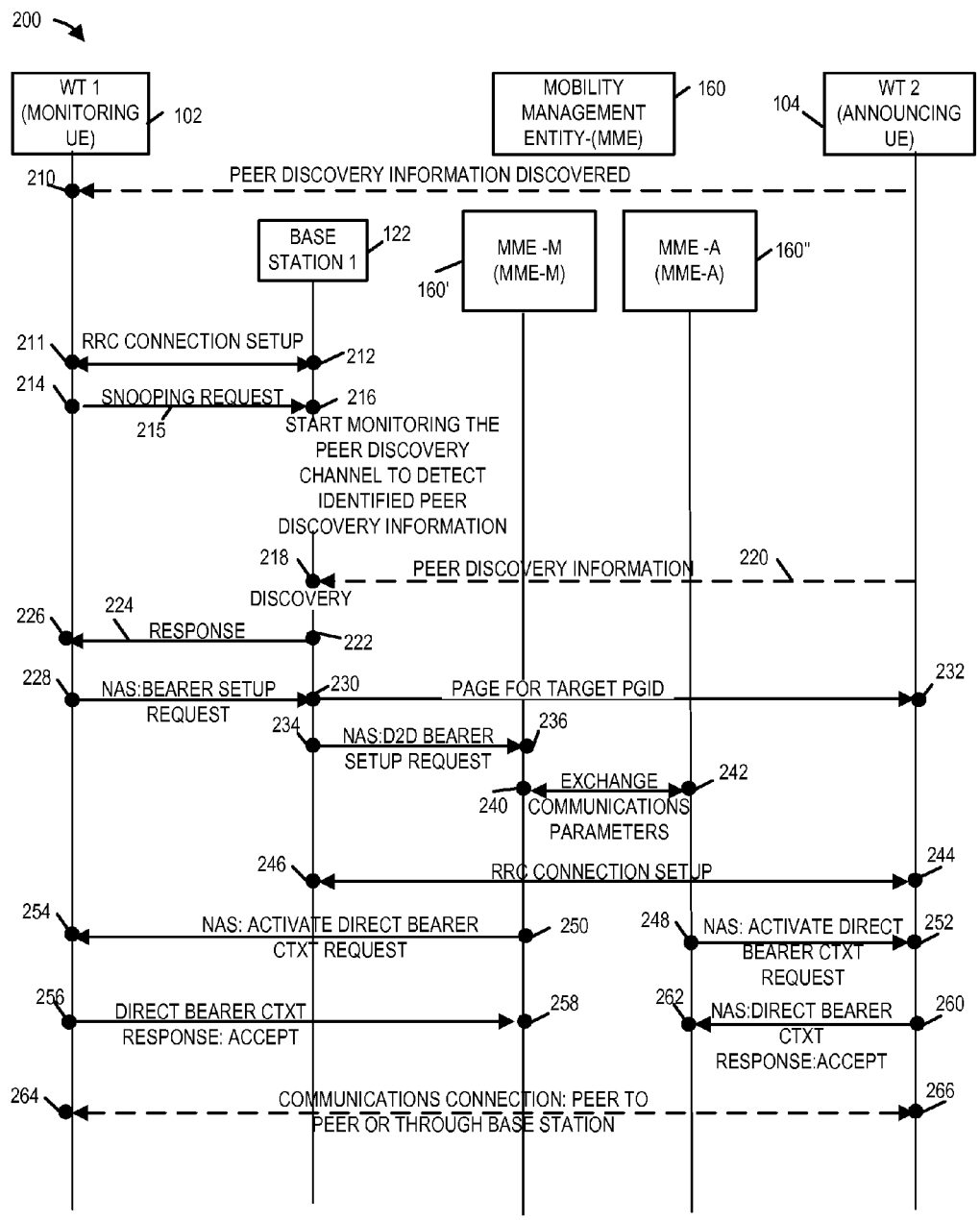
FIG. 2 illustrates an exemplary signaling exchange between communication devices of the system of FIG. 1 and steps associated with an exemplary method that facilitates locating an announcing peer device and establishing communications, in accordance with one exemplary embodiment.

FIG. 2 is a drawing 200 illustrating the steps and associated signaling used in one exemplary embodiment where a base station, associated with both a monitoring UE and an announcing UE, facilitates announcing UE location determination and communications establishment after initial detection of discovery information, e.g., device, application, service identifiers etc., from an announcing UE, e.g., via LTE compliant peer discovery process. To facilitate better understanding of the exemplary process illustrated in FIG. 2, consider the system shown in FIG. 1. Various devices participating in the exemplary method illustrated in FIG. 2 are shown on the top, and include wireless terminal WT 1 102 (monitoring UE) and wireless terminal WT 2 104 (announcing UE), the base station 1 122, a mobility management entity 160' corresponding to the monitoring UE (MME-M), e.g., WT 1 102, and a mobility management entity 160" corresponding to the announcing UE (MME-A) e.g., WT 2 104. In some embodiments, the MME-M 160' and MME-A 160" are included as mobility management entity modules in the mobility management entity device 160. Various signals and messages that may be exchanged between devices are shown using arrows.

In the example illustrated in FIG. 2, the process is initiated following initial detection by the monitoring UE 102 of peer discovery information, e.g., device identifier, service identifier, application identifier etc., from the announcing UE 104. This is illustrated in step 210 where the monitoring UE 102 detects/receives the discovery information.

In steps 211 and 212, WT 1 102 and base station 1 122 exchange signaling for radio resource control (RRC) connection setup. Following the RRC connection setup, in accordance with one aspect, the monitoring UE, i.e., WT 1 102, in step 214 sends a snooping request 215 requesting peer to peer communications discovery assistance, to the base station 1 122 via a wide area network (WAN) uplink communications channel. In some embodiments, the snooping request 215 is a Radio Resource Control RRC message defined for LTE systems. Although in the example of FIG. 2 it is illustrated that WT 1 102 sends the request 215 to base station 122, it should be appreciated that WT 1 102 may, and in some embodiments does, send the snooping request 215 to a plurality of base stations in the transmission range of WT 1 102. In some other embodiments, the monitoring device WT 1 102 sends the snooping request 215 to its serving base station 122, which relays the request with the discovery information to one or more other base stations in the proximity, e.g., via the inter eNodeB X2 interface defined in LTE system.

In various embodiments, the snooping request includes information identifying peer to peer communications discovery information that a monitoring UE, e.g., WT 1 102, is seeking to detect. In some embodiments, the snooping request 215 further includes information indicating a portion of a discovery channel which is to be monitored for the peer to peer communications discovery information, e.g., a specific location in the discovery channel where the announcing UE's discovery information, e.g., service announcements, can be found. In some embodiments, the information identifying the peer to peer communications discovery information indicates the expected peer discovery information to be announced by the announcing UE (WT 2 104) in the current and next few discovery cycles.

In step 216, the base station 1 122 receives and processes the snooping request and starts monitoring the peer discovery channel to detect identified discovery information. It should be appreciated that one or more base stations which receive the snooping request 215 will then snoop, e.g., monitor, the discovery channel to detect whether the expected peer information is heard or not.

In step 218, the base station 122 receives a peer discovery signal 220 communicating the peer discovery information for which the snooping request 215 was made. In accordance with one aspect, when the base station 122 detects the identified peer discovery information from the announcing UE 104 in step 218, the base station performs a signal to noise ratio (SNR) measurement on the received peer discovery signal 220.

In step 222, the base station 122 sends a response signal, e.g., message, 224 confirming the discovery of the monitoring-UE-specified discovery information and reporting the signal strength, e.g., SNR measurement, of the detected discovery signal transmitted by the announcing UE 104. The response message 224 may be a message of the type shown in FIG. 8 or 9 but may also take other forms. In some embodiments, the response signal 224 includes identification information identifying the base station 122 which detected the peer discovery information or location determination node 170. In some embodiments, the response signal 224 further includes location information of the announcing UE 104. In some such embodiments, the location of the announcing UE 104 is determined by an infrastructure element, e.g., such as a base station serving the announcing UE 104 and/or a location determination node in the system. In various embodiments, the response signal 224 is communicated in a unicast message from the base station 122 to the WT 102. In some embodiments, the response signal 224 is a Radio Resource Control RRC message defined for LTE systems.

In step 226, the monitoring UE 102 receives and processes the response 224. It should be appreciated that in the example illustrated in FIG. 2, a response received from a single base station is shown, however a plurality of responses may be received by the monitoring UE 102 from various other base stations which have received a snooping request either directly or indirectly. In step 226, the monitoring UE 102 determines, from the received response, a proximate location of the announcing UE 104 and/or the base station nearest to the announcing UE 104. In the event when the monitoring UE 102 receives a plurality of responses from different base stations, in some embodiments the monitoring UE 102 compares the reported SNR measurements included in the respective responses and selects a response that includes the highest SNR measurement, and thus decides to select the base station that sent the selected response as a location approximation of the announcing UE 104. In some embodiments, the monitoring UE can triangulate the position of the announcing UE based on signal strengths from different base stations.

Assuming that the monitoring UE 102 wants to reach the announcing UE 104 for a peer-to-peer communication, having determined the proximate location of the announcing UE 104, next in step 228 the monitoring UE 102 triggers the WAN-assisted paging to reach the announcing peer 104 via the base station serving and/or close to the announcing UE 104. Signaling related to WAN assisted paging operation is illustrated in steps 228 through 262.

In step 228, a NAS (Non-Access-Stratum) bearer setup request is sent to base station 1 122 serving the monitoring UE 102 to trigger paging of the announcing UE 104. The NAS bearer setup request message may, and in some embodiments does, include the Paging ID of the announcing WT and an indication of the base station or base stations which are to page the announcing WT, i.e., announcing UE 104. The NAS bearer setup request triggers paging of the announcing WT 2 104 by base station 1 122 which detected the discovery transmission by the WT 2 104. The paging identifier PGID of the WT 2 104 is included in the page message which is sent to the WT 2 and received in step 232. Following paging, base station 122 sends an NAS D2D (Device to Device) bearer setup request in step 234 to MME-M 160' which is the mobility management entity 160' of the mobility management entity 160 which corresponds to WT 1 102.

In step 236, the MME-M 160' receives the NAS D2D message and processes the message. The NAS D2D triggers an exchange in steps 240, 242 between the mobility management entity (MME-A 160") corresponding to the announcing WT 2 104 and the MME-M 160' corresponding to the monitoring WT 1 102. Communications parameters are exchanged in steps 240, 242 relating to device to device connection setup. Following the exchange of the communication parameters, RRC connection setup between base station 1 122 and the announcing UE WT 2 104 proceeds with one or more messages being exchanged between the base station 1 122 and the wireless terminal WT 104 in steps 244, 246.

RRC connection setup is followed by NAS signaling used to activate the direct bearer and provide context information to MME-M 160' and MME-A 160". The signaling includes a NAS Activate Direct Bearer CTXT (Context) Request message sent in step 250 from MME-M 160' to WT 1 102 which is received and processed in step 254. WT1 responds to MME-M 160' by sending, in step 256, a direct bearer context response accept message which is received in step 258. The signaling used to activate the direct bearer also includes an NAS Activate Direct bearer CTXT request sent in step 248 from MME-A 160" to WT 2 104 which is received and processed in step 252. WT 2 104 responds to MME-A 160" by sending, in step 260, a direct bearer context response accept message which is received in step 262.

After establishment of the direct bearer channel, direct device to device communications proceeds in steps 264 and 266 in which the WTs 102, 104 communicate with each other. Alternatively, communication between WTs 102, 104 may proceed through an infrastructure element such as a base station if direct device to device communication is impractical. As should be appreciated communication through an infrastructure element may, and in some embodiments does occur in cases where one of WTs 102, 104 has moved after initially being discovered via a directly received signal. For example, WT 104 may have moved from a position near WT 102 to a location in another cell and/or to a position where interference and/or transmission power levels that would be required for direct device to device communication make communication through a base station preferably from an interference and/or transmission power level perspective. In some embodiments the base station in a cell in which WT 102 and/or 104 is located determines whether direct device to device communication or communication through an infrastructure element such as a base station should be used. Thus, in at least some such embodiments a base station or other network controller controls whether communication between WTs 102, 104 will proceed using direct device to device communication or communication through an infrastructure element.

It should be appreciated that base station assistance of WT tracking allows a WT 102 to determine the location of WT 104 even when it is out of direct discovery range of the WT 102. This facilitates paging of the WT 104 since WT 102 can quickly determine which base station should be used to page WT 104 and can indicate this to its serving base station when trying to reach WT 104 thereby potentially avoiding the transmission of pages into regions in which WT 104 is not located. This has the potential to save transmission power and avoid interference due to pages which might be transmitted into regions in which WT 104 was not located if pages were sent into a wide paging area in an attempt to reach WT 104. The knowledge of the actual or likely location of WT 104 also allows WT 104 to be reached faster than if multiple paging attempts were needed, e.g., due to uncertainty with regard to the location of WT 104, to contact WT 104. Notably, the methods described herein also allow for WT 102 to stop monitoring the direct discovery channel for expressions corresponding to WT 104 or decrease the rate at which it monitors the direct discovery channel for expression transmitted by WT 104 and rely on the base station monitoring for the desired discovery information relating to one or more announcements, e.g., expressions transmitted by WT 104, on the direct discovery channel. Thus, in some embodiments a UE such as WT 102 reduces the rate at which it monitors for announcements/expressions which it has requested a base station to monitor for after sending the request to a base station to perform such monitoring and/or the UE stops monitoring for the announcements/expressions for which it has requested a base station to assist in monitoring. Thus WT 102 can conserve power relying on base station notifications with respect to detection in at least some announcements after a request for monitoring ahs been sent to a base station. It should be appreciated however that a WT 102 can, and in some embodiments does, continue monitoring for expressions at the same rate as before requesting monitoring assistance from a base station. Since the base station or base stations monitor the direct discovery channel, the announcing WT 104 need not transmit any special messages or signals to the base stations performing the monitoring beyond those that it normally transmits into the direct discovery channel for direct device to device discovery purposes. Thus the methods described herein do not impose an extra burden on announcing UEs as compared to what would be the case if UEs announcing in the direct discovery channel were also required to provide location information to base stations through a wide area network communications channel. In addition it should be appreciated that the burden placed on base stations can be limited since, in at least some embodiments, the base station monitoring of the direct discovery channel is not unlimited but performed in response to request messages from UEs. Thus, in some but not necessarily all embodiments base stations may limit their monitoring of the direct discovery channel to the portions of the direct discovery channel(s) the UEs request be monitored and the expressions/announcements UEs indicate they are seeking.

Thus, communication with the announcing UE WT 104 which was paged using direct location information derived from one or more direct discovery announcements transmitted by UE WT 104 may be via a peer to peer connection or a connection via one or more intermediate base stations.

Figure 3:
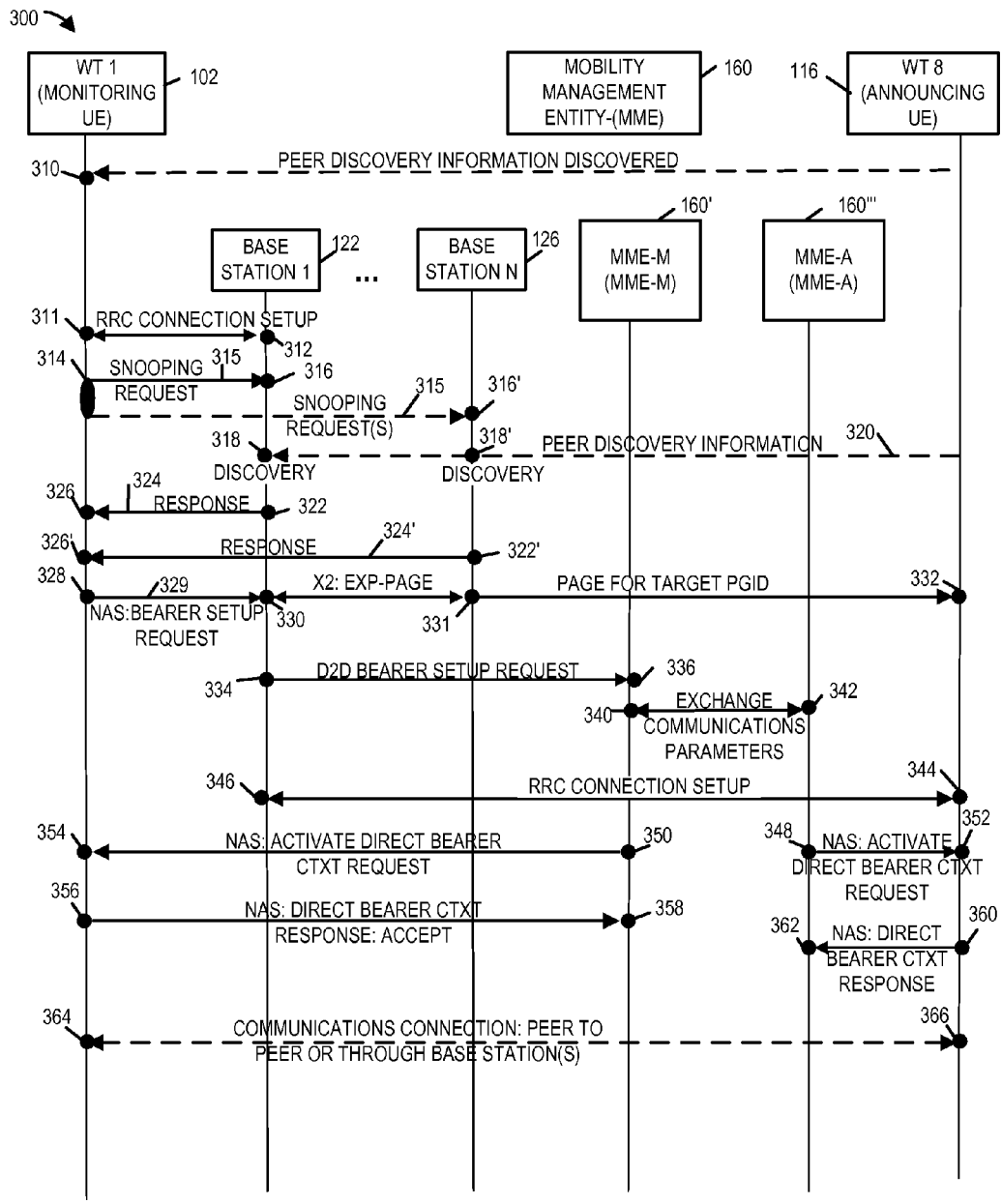
FIG. 3 illustrates an exemplary signaling exchange between communication devices of the system of FIG. 1, and steps associated with an exemplary method that facilitates locating an announcing peer device and establishing communications, in accordance with another exemplary embodiment.

FIG. 3 is a drawing 300 illustrating various signaling and steps associated with an embodiment where the base station corresponding to the monitoring UE and announcing UE are different and a request message is sent to a plurality of neighboring base stations.

As should be appreciated, many of the signals of FIG. 3 are the same as or similar to those shown in FIG. 2. Additional signals between various devices are also shown in the FIG. 3 embodiment, which reflects the involvement of additional base stations in the monitoring and detection of the peer discovery signals. The exemplary embodiment of FIG. 3 will now be discussed in detail.

Various devices participating in the exemplary method illustrated in FIG. 3 are shown on the top, and include WT 1 102 (monitoring UE) and WT 8 116 (announcing UE), a plurality of base stations including base station 1 122, base station N 126, a mobility management entity 160' corresponding to the monitoring UE (MME-M), e.g., the MME for WT 1 102, and a mobility management entity 160''' for the announcing UE (MME-A), e.g., WT 8 116 in this example. The MME-A 160''' is different from that of FIG. 2 since it corresponds to a different announcing device, i.e., WT 8 116 rather than WT 2 104. MME-A 160' and MME-M 160' may be part of the same MME device 160 which serves both regions 1 and N in which base stations WT1 and WT 8 are located, respectively. Thus, in at least some embodiments the MME-M 160' and MME-A 160''' are included as mobility management entity modules in the mobility management entity device 160. Various signals, messages that may be exchanged between devices are shown using arrows.

In the example illustrated by FIG. 3, the process is initiated following initial detection by the monitoring UE 102 of peer discovery information, from the announcing WT 8 (UE) 116. This is illustrated in step 310 where the monitoring UE 102 detects/receives the peer discovery information.

In steps 311 and 312 WT 1 102 and base station 1 122 exchange signaling for radio resource control (RRC) connection setup. Following the RRC connection setup, in accordance with one aspect, the monitoring UE, i.e., WT 1 102, in step 314 sends a snooping request 315 requesting peer to peer communications discovery assistance, to the base station 1 122 via a wide area network (WAN) uplink communications channel. In some embodiments, the snooping request 315 is a RRC message defined for LTE systems. The message may be the same as or similar to the message 700 shown in FIG. 7. In the FIG. 3 example, the snooping request 315 is sent to base station 122 which serves WT 1 102 and to a plurality of other neighboring base stations. The request 315 may be sent via a direct transmission to the neighboring base stations, or in some other embodiments, the request 315 is sent from the monitoring UE 102 to the serving base station 122 which then relays or forward the request with the discovery information to be detected to one or more other base stations in the proximity, e.g., via the inter eNodeB X2 interface defined in LTE system.

In various embodiments, the snooping request 315 includes information identifying peer to peer communications discovery information that a monitoring UE, e.g., WT 1

102, is seeking to detect. In some embodiments, the snooping request 315 further includes information indicating a portion of a discovery channel which is to be monitored for the peer to peer communications discovery information, e.g., a specific location in the discovery channel where the announcing UE's discovery information, e.g., service announcements, can be found. In some embodiments, the information identifying the peer to peer communications discovery information indicates the expected peer discovery information to be announced by the announcing UE (WT 8 116) in the current and next few discovery cycles.

In steps 316, 316' the base stations receive and process the snooping request 315 and start monitoring the peer discovery channel to detect the discovery information identified by the monitoring UE 102. Thus upon receipt of the request, one or more base stations receiving the snooping request 315 will then monitor the discovery channel, or portions thereof indicated in the snooping request, to detect whether the expected peer information is heard or not.

In steps 318, 318' the base stations 122, 126 respectively receive a peer discovery signal 320 communicating the peer discovery information for which the snooping request 315 was made. In accordance with one aspect, following the detection by base stations 122, 126 of the peer discovery information from the announcing UE116, in steps 318, 318' each of these base stations respectively perform a signal to noise ratio (SNR) measurement on the received peer discovery signal 320.

Figure 9:
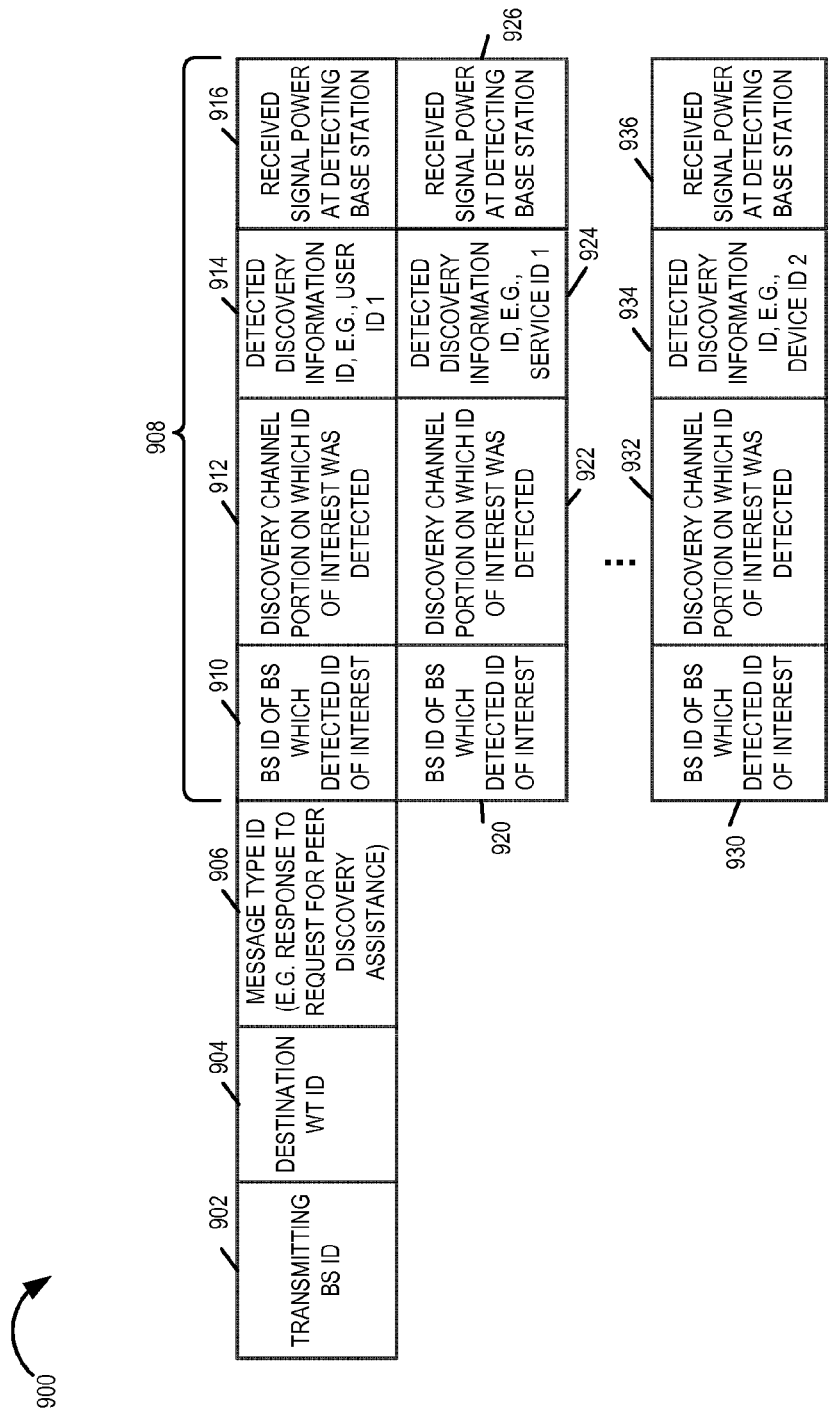
FIG. 9 illustrates an exemplary peer to peer discovery assistance request response message, e.g., communicated from a base station and directed to a monitoring wireless terminal, in accordance with an exemplary embodiment that can be used in any one of the systems shown in FIGS. 1-3.

In steps 322, 322' the base stations 122, 126 send response signals (324, 324') respectively confirming the discovery of the monitoring-UE-specified discovery information and reporting the signal strength, e.g., SNR measurements, of the detected discovery signal transmitted by the announcing UE 116. In some embodiments, the response signals 324,324' include identification information identifying the respective base stations which detected the peer discovery information. In some embodiments, the response signals 324,324' further include location information of the announcing UE 116. In some such embodiments, the location of the announcing UE 116 is determined by an infrastructure element, e.g., such as a base station serving the announcing UE 116 and/or a location determination node in the system. In various embodiments, each response signal 324, 324' is communicated in a unicast message from the corresponding base station to the monitoring UE 102. However, in some embodiments responses are sent to base station 122, the base stating serving the monitoring UE 102, which then combines detection information received from one or more base stations along with detection information it generates, into a single message that is communicated to the monitoring UE 102. FIG. 9 illustrates an exemplary message which may be used in the case where the serving base station combines information from multiple detection messages into a single message which is sent to the monitoring UE 102. In some but not necessarily all embodiments, the response signals 324, 324' are Radio Resource Control RRC messages defined for LTE systems.

In steps 326, 326' the monitoring UE 102 receives and processes the response signals 324, 324'. Further in steps 326, 326' having received and processed the response signals, the monitoring UE 102 determines, from the received response signals, an approximate location of the announcing UE 116. In some embodiments, as part of determining the approximate location of the announcing UE 116, the monitoring UE 102 compares the reported SNR measurements included in the respective response signals 324, 324' and selects a response including the SNR measurement with a greater value, and decides to select the base station that sent the selected response as a location approximation of the announcing UE 116. For example, in the FIG. 3 embodiment, it is more likely that the SNR of the peer discovery signal 320 measured by base station 126 will be greater than the SNR of the peer discover signal measured by base station 122, e.g., because of the proximity of UE 116 to base station 126. Thus, the monitoring UE 102 is more likely to determine location based on the response signal 324' and identify BS 126 as the base station to be used for paging UE 116.

Assuming that the monitoring UE 102 wants to reach the announcing UE 116 for a peer-to-peer communication, having determined the location of the announcing UE 116, next in step 328, the monitoring UE 102 triggers the WAN-assisted paging to reach the announcing peer 116 via the base station serving and/or close to the announcing UE 116. Steps relating to WAN assisted paging operation and connection establishment include steps 328 through 362.

In step 328 an NAS bearer setup request message 329 is sent from WT 1 102 to BS 122 which is the serving base station for WT 1 102. The message 329 may, and in some embodiments does, include the paging ID (PGID) of the announcing WT 8 116 along with information identifying the base station 126 corresponding to the determined location of WT 8 116 through which a page is to be sent to WT 8 116. BS 1 122 recognizes that it is to trigger paging through BS N 126 and sends an expand page message X2: EXP-Page in step 330 to base station N 126. In step 331, base station N 126 transmits a page including the PGID of WT 8 116 which is then received by WT 8 116 in step 332.

Following transmission of the page bearer setup, signaling is performed in the same as or similar manner as described in FIG. 2. In step 334, base station 1 122 sends a D2D bearer setup request to MME-M 160' corresponding to WT 1. In step 336, MME-M 160' receives the request. Exchange of communications parameters as part of the connection setup process between WT 1 102 and WT 8 116 is then performed in step 340 and 342 with communications parameters being exchanged between MME-M 160' and MME-A 160'". The exchange of communication parameters between MME's corresponding to WT 1 102 and WT 8 116 is followed by RRC connection setup signaling, which occurs in steps 346 and 344, between base station 122 serving the monitoring WT 1 102, and the announcing WT 8 116.

The RRC signaling is followed by the MME-M 160' sending, in step 350, an NAS activate direct bearer context request message to the monitoring UE WT 102 which is received in step 354. WT 1 102 responds in step 356 by sending an NAS direct bearer context response accept message to MME-M 160' which is received by the MME-M 160' in step 358. Similar NAS singling is performed between MME-A 160'" and WT 8 116. MME-A 160', in step 348 sends an NAS activate direct bearer context request message to the announcing UE WT 8 116 which is received in step 352. WT 8 116 responds in step 360 by sending an NAS direct bearer context response accept message to MME-A 160'" which is received by the MME-A 160' in step 362. Once the bearer channel has been set up communication between WT 1 102 and WT 8 116 can proceed.

In steps 364 and 366 communication between the two UEs proceeds with the WTs sending and receiving data over the established connection. The communications connection may be a peer to peer connection over a direct peer to peer communications channel or a connection via one or more intermediate base stations.

While described in the context of an LTE example and using general LTE terminology, it should be appreciated that the methods and apparatus described herein are not intended to be limited to LTE implementations and may be used in a wide range of applications and systems where one or more base stations are available to monitor a peer discovery communications channel.

Figure 4:
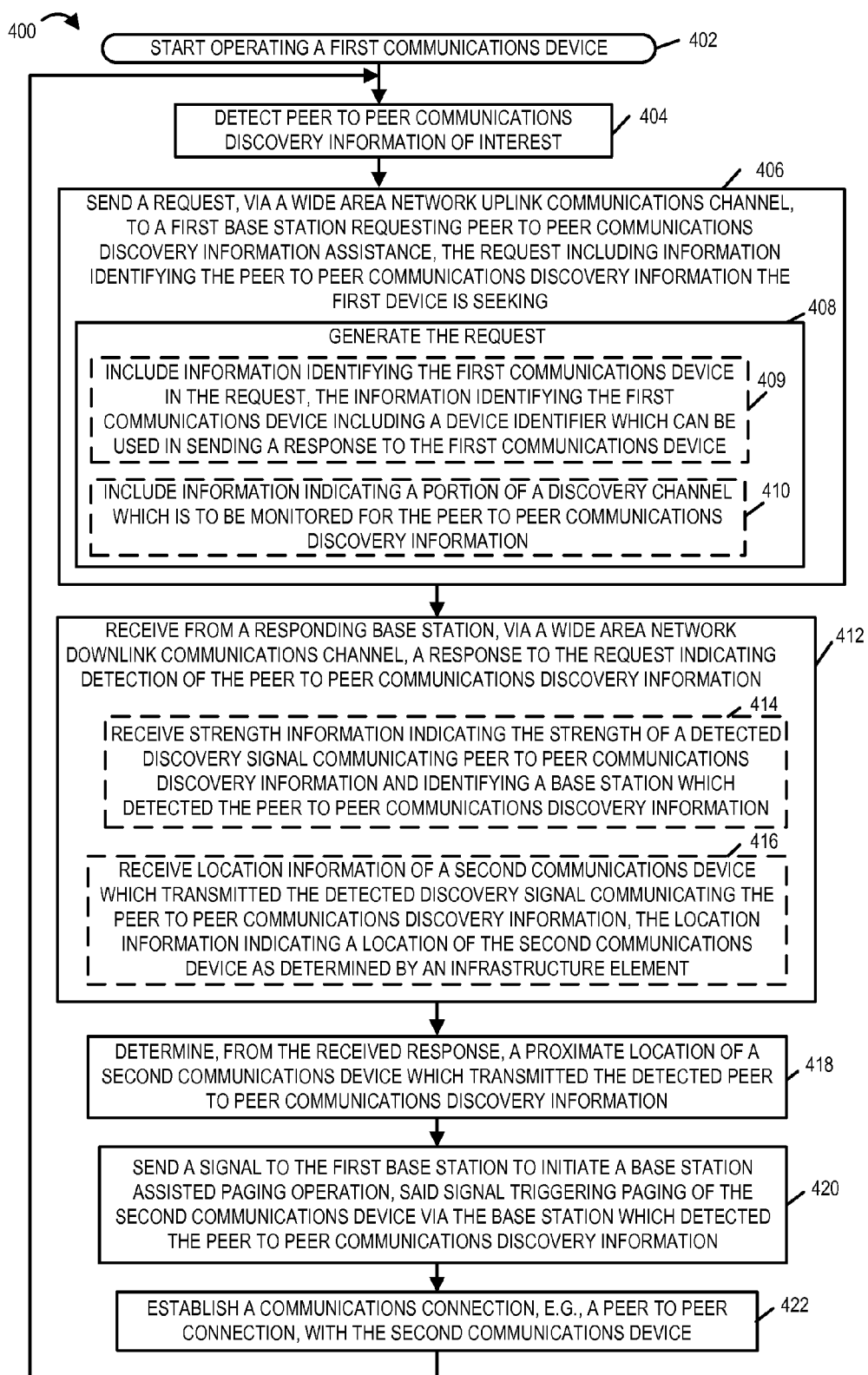
FIG. 4 is a flowchart illustrating an exemplary method of operating a communications device, e.g., of the system shown in FIG. 1, in accordance with one exemplary embodiment.

While some examples discussed above have been used to describe various features, the method used in some embodiments will become even clearer when considered in view of the flow chart shown in FIG. 4.

FIG. 4 is a flowchart 400 showing the steps of an exemplary method of operating a communications device, e.g., a first wireless terminal (UE), in accordance with an exemplary embodiment. In some embodiments, the first wireless terminal is any one of the wireless terminals shown in FIG. 1. For the purposes of discussion consider that WT 1 102 is first wireless terminal implementing the method of flowchart 400.

Operation starts in step 402. In step 402 the WT 1 102 is powered on, initialized and begins monitoring for messages and/or other signals. Operation proceeds from start step 402 to step 404. In step 404, the WT 1 102 detects peer to peer communications discovery information from a peer device, e.g., an announcing peer device such as WT 2 104. In some embodiments, the peer to peer communications discovery information is one of a peer device discovery information, service discovery information, or an application discovery information. For example, peer device discovery information may be a device identifier, service discovery information may be a service identifier corresponding to a service being announced by a peer device, and application discovery information may be an application identifier corresponding to an application being advertised by a peer device. In some embodiments, WT 1 102 detects the peer to peer communications discovery information by monitoring a direct communications channel intended to support direct peer to peer discovery by the devices which support, e.g., are capable of implementing, peer to peer communications.

Operation proceeds from step 404 to step 406. Assuming that the WT 102 is interested in communicating with the device which transmitted the detected peer to peer communications discovery information, in step the WT 102 sends a request (e.g., snooping request 215 discussed in FIG. 2), via a wide area network uplink communications channel, to a first base station requesting peer to peer communications discovery assistance, said request including information identifying peer to peer communications discovery information the wireless terminal 102 is seeking to detect. In some embodiments, WT 102 may send the request to a plurality of base stations in the transmission range of the WT 102. In some embodiments, the request may be relayed by the first base station, which directly receives the request, to a plurality of other base station.

In various embodiments, step 406 includes step 408 in which WT 1 102 generates the request for peer to peer communications discovery assistance. In some embodiments, the step 408 of generating the request includes performing one or both of the sub-steps 409 and 410, which are optional and shown in dashed boxes. In step 409, as part of generating the request, the WT 1 102 includes information identifying the first communications device in the request, the information identifying the first communications device including a device identifier, e.g., WT 1 102 identifier, which can be used in sending a response to the first communications device. Thus, the request includes information sufficient for a responding device, e.g., a base station, to send a response back to the WT 1 102. In sub-step 410, the WT 1 102 includes information indicating a portion of a peer discovery channel which is to be monitored for the peer to peer communications discovery information. Thus, in some embodiments the request includes information indicating where the expected peer discovery information can be found in the peer discovery channel. In some such embodiments, the request includes a peer discovery resource identifier (PDRID) identifying the resource using which the expected peer to peer communications discovery information is announced in the peer discovery channel.

Operation proceeds from step 406 (which includes steps 408, 409 410) to step 412. In step 412, the first device WT 1 102 receives from a responding base station, via a wide area network downlink communications channel, a response to the request indicating the detection of the peer to peer communications discovery information. In some embodiments, the response is communicated in a unicast message from the responding base station to the first communications device WT 1 102. In some embodiments, the responding base station is a base station to WT 1 102 directly transmitted the request or a base station which received the request from a base station to which WT 1 102 directly transmitted the request. As discussed with regard to the FIGS. 2-3 examples, it should be appreciated that the first device WT 1 102 may receive responses from more than one base station, e.g., from a plurality of base stations.

In various embodiments, step 412 of receiving the response includes steps 414 and 416. In some embodiments, one or both of the steps 414 and 416 are performed as part of performing step 412. In step 414, the first communications device receives, as part of the response, strength information indicating strength of a detected peer discovery signal communicating the peer to peer communications discovery information and identifying a base station which detected the peer to peer communications discovery information. In some embodiments, the strength information includes the results of an SNR measurement performed on the discovery signal.

In step 416, the first communications device receives, as part of the response, location information of a second communications device, e.g., an announcing peer device such as WT 2 104, that transmitted the detected discovery signal communicating the peer to peer communications discovery information, the location information indicating a location of the second device being determined by an infrastructure element. In some embodiments, the infrastructure element is one of a base station serving the second device or the base station from which the response is received. Thus the location information corresponding to the second device may be determined by the base station serving the second device or by another base station that detected the discovery information and responded to the first device WT 1 102.

Operation proceeds from step 412 to step 418. In step 418, WT 1 102 determines a proximate location of the second communications device, which transmitted the detected discovery signal communicating the peer to peer communications discovery information, from the received response. WT 1 102 may determine the second device location in a variety of ways. In some embodiments, when the first communications device 102 receives a plurality of responses from different base stations, the first communications device 102 compares the reported SNR measurements included in the respective responses and selects a response that includes the highest SNR measurement corresponding to the discovery signal communicating the discovery information, and selects the base station that sent the selected response as a location approximation of the second communications device WT 104. In some embodiments, the WT 102 can triangulate the position of the second device based on reported signal strengths from different base stations.

The operation proceeds from step 418 to step 420. Having determined the proximate location of the second device, next in step 420 the first communications device WT 102 triggers the WAN-assisted paging to reach the announcing peer 104, e.g., via a base station serving and/or close to the second device WT 104. In various embodiments, the first and second communications devices support device to device communication. In step 420, the first communications device sends a signal to the first base station to initiate a base station assisted paging operation, the signal triggering paging to the second communications device via the base station that detected the discovery signal communicating the discovery information. Thus, the WT 1 102 sends a signal to the base station which detected the discovery information to assist in paging the second device, e.g., in initiating a communications connection, with the second device WT 104. In some embodiments, the signal enables direct peer-to-peer communication to be initiated between the first communications device WT 1 102 and the second communications device WT 104.

Operation proceeds from step 420 to step 422. In step 422, the first communications device establishes a communications connection, e.g., a direct peer to peer communications connection, between the first communications device and the second communications device. Operation proceeds from step 422 back to step 404 and the operation may continue in this manner over time.

Figure 5:
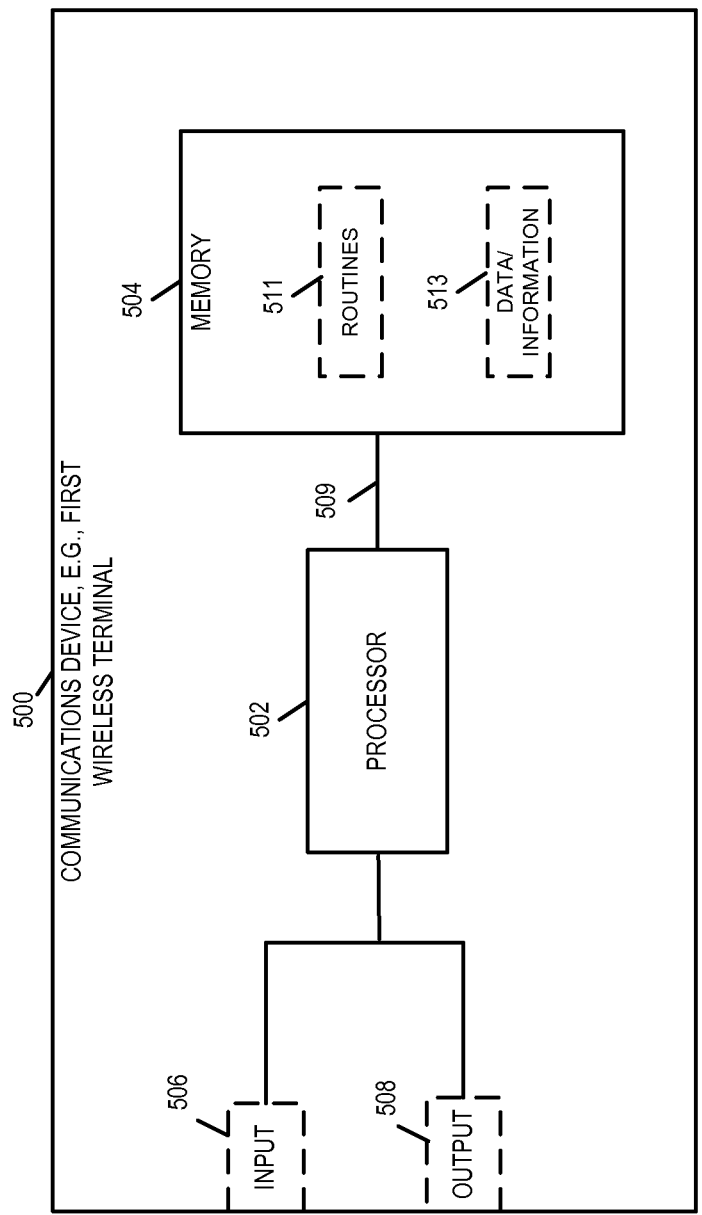
FIG. 5 illustrates an exemplary communications device which can be used as any one of the wireless terminals (UEs) shown in the exemplary system shown in FIG. 1.

FIG. 5 is a drawing of an exemplary first communications device 500, e.g., a first wireless terminal, in accordance with one exemplary embodiment. The first communications device 500 can be used as any one of the wireless terminals (UEs) shown in the system of FIG. 1. Exemplary communications device 500 may, and sometimes does, implement a method in accordance with flowchart 400 of FIG. 4.

Communications device 500 includes a processor 502 and memory 504 coupled together via a bus 509 over which the various elements (502, 504) may interchange data and information. Communications device 500 further includes an input module 506 and an output module 508 which may be coupled to the processor 502 as shown. However, in some embodiments the input module and output module 506, 508 are located internal to the processor 502. Input module 506 can receive input signals. Input module 506 can, and in some embodiments does, include a wireless receiver and/or a wired or optical input interface for receiving input. Output module 508 may include, and in some embodiments does include, a wireless transmitter and/or a wired or optical output interface for transmitting output. In some embodiments the processor 502 is configured to send, e.g., transmit, signals via the output module 508 and receive signals via the input module 506. The signals which are sent by the processor 502 via the output module 508 may, and in some embodiments do, include a request that is being sent over a WAN uplink communication channel to a base station requesting peer to peer communications discovery assistance. In at least some embodiments the processor receives a response to the request via the input module 506.

In some embodiments, memory 504 includes routines 511 and data/information 513.

Processor 502, in some embodiments, is configured to detect peer to peer communications discovery information from peer devices, e.g., announcing peer devices such as WT 2 104. In some embodiments, the peer to peer communications discovery information is one of a device identifier, service identifier corresponding to a service being announced by a peer device, or an application identifier corresponding to an application being advertised by a peer device.

In various embodiments, the processor 502 is further configured to generate a request for peer to peer communications discovery assistance (e.g., snooping request 215 discussed in FIG. 2), send the request (e.g., using output module 508) via a wide area network uplink communications channel, to a first base station requesting peer to peer communications discovery assistance, the request including information identifying peer to peer communications discovery information the first communications device 500 is seeking to detect. In some embodiments, the processor 502 is configured to send (e.g., using output module 508) the request to a plurality of base stations in the transmission range of the device 500. In some embodiments, as part of generating the request, the processor 502 is configured to include in the generated request, at least one of: (i) information identifying the first communications device 500 in the request, the information identifying the first communications device including a device identifier which can be used in sending a response to the first communications device, and (ii) information indicating a portion of a peer discovery channel which is to be monitored for the peer to peer communications discovery information. Thus, in some embodiments the request includes information indicating where the expected peer discovery information can be found in the peer discovery channel.

The processor 502 is further configured to receive from a responding base station (e.g., using input module 506), via a wide area network downlink communications channel, a response to the request indicating the detection of the peer to peer communications discovery information. In some embodiments, the response is communicated in a unicast message from the responding base station to the first communications device 500. In some embodiments, the responding base station is a base station to which the first communications device 500 directly transmitted the request or a base station which received the request from a base station to which the first communications device 500 directly transmitted the request. In some embodiments, the processor 502 is configured to receive responses (e.g., using input module 506) from more than one base station, e.g., from a plurality of base stations.

In some embodiments, the processor 502 is configured to receive signal strength information (SNR) indicating strength of a detected peer discovery signal communicating the peer to peer communications discovery information and identifying a base station which detected the peer to peer communications discovery information, as part of being configured to receive the response. In some embodiments, the processor 502 is further configured to receive location information of a second communications device which transmitted the detected discovery signal communicating the peer to peer communications discovery information, as part of being configured to receive the response. In some embodiments, the location information indicates a location of the second device as determined by an infrastructure element. In some embodiments, the infrastructure element is one of a base station serving the second device or the base station from which the response is received.

In various embodiments, the processor 502 is further configured to determine a proximate location of the second communications device which transmitted the detected discovery signal communicating the peer to peer communications discovery information, from the received response. In some embodiments, the first communications device 500 receives a plurality of responses from different base stations and the processor is configured to compare the reported SNR measurements included in the respective responses and select a response that includes the highest SNR measurement corresponding to the discovery signal communicating the discovery information. In some such embodiments, the processor 502 is configured to select the base station that sent the selected response as a location approximation of the second communications device. In some embodiments, the processor 502 is further configured to triangulate the position of the second device based on reported signal strengths (reported SNR measurements) from different base stations.

In some embodiments, the processor 502 is further configured to send (e.g., using output module 508) a signal to the first base station to initiate a base station assisted paging operation, the signal triggering paging to the second communications device via the base station which detected the discovery signal communicating the discovery information. Thus, the processor is configured to control the communications device 500 to trigger the WAN-assisted paging to reach the second device (announcing peer device), e.g., via a base station serving and/or close to the second device. In some embodiments, the signal enables direct peer-to-peer communication to be initiated between the first communications device and the second communications device. In various embodiments, the first communications device and the second communication device support device to device communication. The processor 502 in some embodiments is further configured to establish (e.g., using input module 506 and output module 508) a communications connection, e.g., a direct peer to peer communications connection, with the second communications device.

Figure 6:
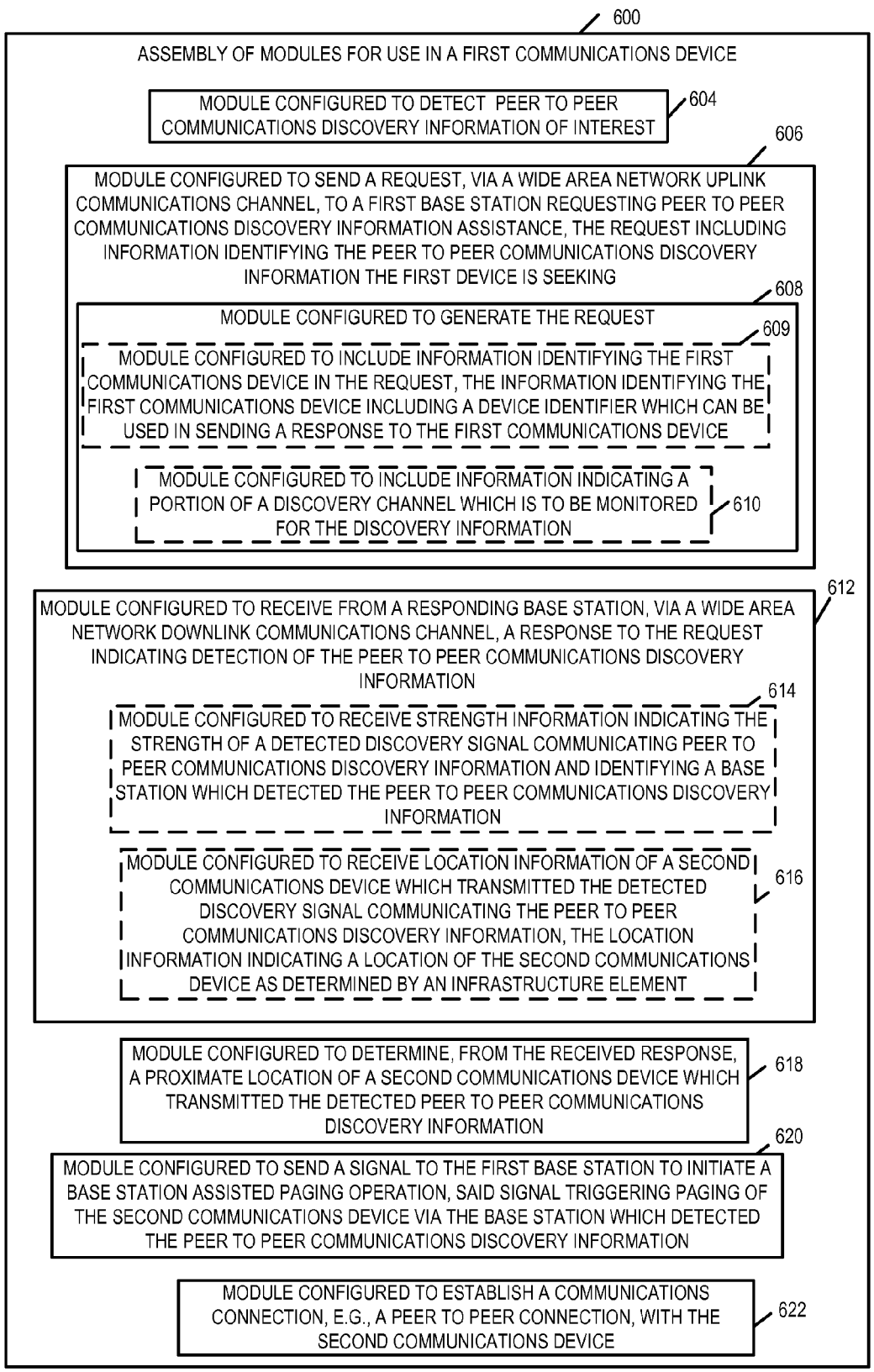
FIG. 6 illustrates an assembly of modules, which can be used in the exemplary communications device shown in FIG. 5.

FIG. 6 is an assembly of modules 600 which can, and in some embodiments is, used in the first communications device 500 illustrated in FIG. 5. Assembly of modules 600 can be implemented in hardware within the processor 502 of the communications device 500 of FIG. 5, e.g., as individual circuits. Alternatively, the modules may be implemented in software and stored in the memory 504 of the communications device 500. While shown in the FIG. 5 embodiment as a single processor, e.g., computer, it should be appreciated that the processor 502 may be implemented as one or more processors, e.g., computers.

When implemented in software the modules include code, which when executed by the processor 502, configure the processor to implement the function corresponding to the module. In embodiments where the assembly of modules 600 is stored in the memory 504, the memory 504 is a computer program product comprising a computer readable medium comprising code, e.g., individual code for each module, for causing at least one computer, e.g., processor 502, to implement the functions to which the modules correspond. In some such embodiments, the assembly of modules 600 is included in routines 511 of memory 504 of device 500 of FIG. 5.

Completely hardware based or completely software based modules may be used. However, it should be appreciated that any combination of software and hardware, e.g., circuit implemented modules may be used to implement the functions. As should be appreciated, the modules illustrated in FIG. 6 control and/or configure the communications device 500 or elements therein such as the processor 502, to perform the functions of the corresponding steps illustrated in the method flow chart 400 of FIG. 4.

The assembly of modules 600 includes a module corresponding to each step of the method shown in FIG. 4. The module in FIG. 6 that performs or controls the processor 502 to perform a corresponding step shown in FIG. 4 is identified with a number beginning with a 6 instead of beginning with 4. For example, module 604 corresponds to step 404 and is responsible for performing the operation described with regard to step 404.

As illustrated in FIG. 6, the assembly of modules 600 includes a module 604 configured to detect peer to peer communications discovery information from peer devices, e.g., announcing peer devices such as WT 2 104. In some embodiments, the peer to peer communications discovery information is one of a device identifier, service identifier corresponding to a service being announced by a peer device, or an application identifier corresponding to an application being advertised by a peer device.

In various embodiments, the assembly of modules further includes a module 606 configured to send a request (e.g., snooping request 215) via a wide area network uplink communications channel, to a first base station requesting peer to peer communications discovery assistance, the request includes information identifying peer to peer communications discovery information the first communications device 500 is seeking to detect. In various embodiments, the module 606 includes a module 608 configured to generate the request for peer to peer communications discovery assistance, a module 609 configured to include in the generated request, information identifying the first communications device in the request, the information identifying the first communications device including a device identifier which can be used in sending a response to the first communications device, and a module 610 configured to include information indicating a portion of a peer discovery channel which is to be monitored for the peer to peer communications discovery information. In some embodiments, the module 606 is configured to send the request to a plurality of base stations in the transmission range of the communications device 500.

The assembly of modules 600 further includes a module 612 configured to receive, from a responding base station via a wide area network downlink communications channel, a response to the request indicating the detection of the peer to peer communications discovery information. In some embodiments, the response is communicated in a unicast message from the responding base station to the first communications device 500. In some embodiments, the responding base station is a base station to which the request was directly transmitted or a base station which received the request from a base station to which the request was directly transmitted. In some embodiments, the module 612 is configured to receive responses from more than one base station, e.g., from a plurality of base stations. In some embodiments, the module 612 further includes a module 614 configured to receive signal strength information (SNR) indicating strength of a detected peer discovery signal communicating the peer to peer communications discovery information and identifying a base station which detected the peer to peer communications discovery information, and a module 616 configured to receive location information of a second communications device which transmitted the detected discovery signal communicating the peer to peer communications discovery information, as part of being configured to receive the response. In some embodiments, the location information indicates a location of the second device as determined by an infrastructure element. In some embodiments, the infrastructure element is one of a base station serving the second device or the base station from which the response is received.

In various embodiments, the assembly of modules 600 further includes a module 618 configured to determine a proximate location of the second communications device which transmitted the detected discovery signal communicating the peer to peer communications discovery information, from the received response. In some embodiments, the module 612 receives a plurality of responses from different base stations, and the module 618 compares the reported SNR measurements included in the respective responses to select a response that includes the highest SNR measurement corresponding to the discovery signal communicating the discovery information. In some such embodiments, the module 618 is configured to select the base station that sent the selected response as a location approximation of the second communications device. In some embodiments, the module 618 is configured to triangulate the position of the second communications device based on reported signal strengths (reported SNR measurements) from different base stations, as part of determining the second device location.

In some embodiments, the assembly of modules 600 further includes a module 620 configured to send a signal to the first base station to initiate a base station assisted paging operation, the signal triggering paging to the second communications device via the base station which detected the discovery signal communicating the discovery information, and a module 622 configured to establish a communications connection, e.g., a direct peer to peer communications connection, with the second communications device. In various embodiments, the first communications device and the second communications device support device to device communication. In some embodiments, the module 622 is configured to establish a communications connection between the first and second communications devices via WAN infrastructure, e.g., via a base station.

The modules shown in dashed lines boxes are optional, and thus one or more of these modules may be present in some embodiments while not in others. The dashed boxes indicate that although these modules are included in the assembly of modules 600 in various embodiments, the processor 502 may execute such an optional module in embodiments where the step to which these modules correspond, is performed. In some embodiments, one or more modules shown in FIG. 6 which are included within another module may be implemented as an independent module or modules.

FIG. 7 illustrates an exemplary peer to peer discovery assistance request message 700, e.g., communicated from a monitoring UE device, e.g., WT 1 102, to one or more base stations, in accordance with an exemplary embodiment. The request message 700 is also referred to as the snooping request as discussed with regard to FIGS. 2-3. The exemplary request message 700 is generated in some embodiments by the monitoring UE requesting assistance in monitoring for one or more peer discovery expressions, and is sent to one or more base stations.

As shown, the exemplary discovery assistance request message 700 includes a plurality of information fields including a source ID field 702, a destination base station (BS) ID(s) field 704, a message type ID field 706, a discovery channel portion(s) to be monitored 708 and a peer to peer discovery information ID(s), e.g., expressions, field 710. The peer to peer discovery information ID(s) field 710 in some embodiments includes one or a plurality of discovery information identifiers, e.g., a service ID, a user ID, a device ID etc.

The source ID 702 is the identifier corresponding to the monitoring UE, e.g., WT 1 102, sending the request message 700. The destination BS ID(s) field 704 includes identifier(s) corresponding the base stations to which the request is sent. In some embodiments, if the request message 700 is being broadcast to a plurality of base stations, field 704 may include a broadcast group identifier. In some embodiments, the field 704 includes BS IDs corresponding to one or more base stations to which the message is sent.

The message type ID field 706 includes an identifier that identifies a type of message to which the request 700 relates, for example, the information in field 706 identifies that the message 700 is a request for peer to peer discovery assistance. The discovery channel portion(s) ID field 708 includes information identifying the portion(s), e.g., communications resource(s), of the peer discovery channel to be monitored by the base stations receiving the request message 700.

The peer to peer discovery information ID(s) field 710 includes information identifying discovery information for which discovery assistance is being requested via the message 700. In some embodiments, the field 710 includes a plurality of service identifiers, e.g., service ID 1 712 through service ID N 716, corresponding to the services for which the monitoring UE 102 seeks discovery assistance. In some embodiments, the field 710 further includes a plurality of device identifiers, e.g., device ID 1 718 through device ID M 722, corresponding to the devices which the monitoring UE 102 seeks to discover, e.g., to communicate. In some embodiments, the field 710 further includes a plurality of user identifiers, e.g., user ID 1 724 through user ID X 728, corresponding to the users devices which the monitoring UE 102 seeks to discover.

FIG. 8 illustrates an exemplary peer to peer discovery assistance request response message 800, e.g., communicated from a base station to the monitoring UE device, in accordance with an exemplary embodiment. The exemplary response message 800 is generated in some embodiments by a responding base station which detected a discovery expression requested to be monitored by a monitoring UE, e.g., WT 102, and is sent to, e.g., the monitoring UE, in response to the received peer discovery assistance request message 700.

As shown the exemplary discovery assistance request response message 800 includes a plurality of information fields including a transmitting base station ID field 802, a destination device, e.g., UE, ID field 804, a message type ID field 806, a detecting base station ID field 808, a discovery channel portion ID field 810, a detected discovery information ID field 812, and a field 814 including signal power level information.

The transmitting base station ID field 802 includes the identifier corresponding to the base station transmitting the response message 800 to the monitoring UE, e.g., to WT 1 102. The destination device ID field 804 includes the identifier corresponding to the monitoring UE to which the response message 800 is sent.

The message type ID field 806 includes an identifier that identifies a type of message to which the response message 800 belongs, for example, the information in field 806 identifies that the response message 800 is a response to a peer discovery assistance request. The detecting base station ID field 808 includes an identifier of the base station that detected the discovery information for which the request 700 was made by the monitoring UE device. It should be appreciated that the base station detecting the discovery information, e.g., a service sought by the monitoring UE, may not the same base station that is sending the response message 800. In some embodiments, a base station that receives a discovery assistance request message 700 sends a response to the base station serving the monitoring UE which ultimately generates a response message and sends it to the monitoring UE. However, it is possible in some cases that the base station detecting the discovery expression also sends the response message such as response 800 to the monitoring UE.

The discovery channel portion ID field 810 includes information identifying the portion, e.g., communications resource(s), of the peer discovery channel on which the discovery information of interest is detected.

The detected discovery information ID field 812 includes the information identifying the detected discovery information, e.g., a detected user ID, service ID, device ID etc. In some embodiments, the field 812 includes a plurality of detected identifiers, corresponding to the requested discovery information, e.g., as specified in the field 710 of request message 700. The signal power information field 814 includes information indicating the received signal power level of the received peer discovery signal communicating the discovery information, measured at the detecting base station. In some embodiments, the signal power information field 814 includes the results of an SNR measurement performed on the received peer discovery signal by a base station that received the peer discovery signal. The SNR information included in field 814 maybe, and an in some embodiments is, in addition to information indicating the received signal power detected and measured by the receiving base station.

FIG. 9 illustrates an exemplary response message 900 generated by a serving base station that is sent to a monitoring UE in response to a peer discovery assistance request message 700. In the FIG. 9 example, a serving base station, e.g., BS 122, that is serving the monitoring UE, generates the response message 900 which is an aggregate of responses received from a plurality of base stations which detected one or more discovery expressions which were requested to be monitored in the request message 700. The serving base station may, and in some embodiments does receive multiple response messages of the type illustrated in FIG. 8 from various other base stations that detected discovery expressions requested to be monitored by the monitoring UE, and generates from the multiple received response messages the aggregate message 900 illustrated in FIG. 9. Thus, airlink resource are conserved by a single response message 900 being communicated from the serving base station to the monitoring UE without the need for the other individual base stations detecting the discovery expressions to wirelessly transmit response messages over the air to the monitoring UE.

As shown, the exemplary discovery assistance request response message 900 includes a plurality of information fields including a transmitting base station ID field 902, a destination device, e.g., UE, ID field 904, a message type ID field 906. The message fields 902, 904 and 906 are the same as fields 802, 804 and 806 discussed above with regard to response message 800. For example, the transmitting base station ID field 902 includes the identifier corresponding to the serving base station transmitting the response message 900 to the monitoring UE, e.g., to WT 1 102. The destination device ID field 904 includes an identifier corresponding to the monitoring UE to which the response message 900 is sent.

The response message 900 further includes information, collectively identified by reference number 908, that is aggregated by the serving base station from one or more responses received from one or more other base stations. Information fields 910, 912, 914, 916 are generated from a response received from, e.g., a first base station, that detected the requested discovery expression. The detecting base station ID field 910 includes an identifier of the first base station that detected the discovery information requested to be monitored in the request message 700. The discovery channel portion ID field 912 includes information identifying the portion, e.g., communications resource(s), of the peer discovery channel on which the discovery information of interest is detected by the first base station identified in field 910. The detected discovery information ID field 914 includes the information identifying the detected discovery information, e.g., user ID 1, detected by the first base station identified in field 910. The signal power information field 916 includes information indicating the received signal power level of the received peer discovery signal communicating the discovery information, measured at the first base station identified in field 910. In some embodiments, the signal power information field 916 includes the results of an SNR measurement performed on the received peer discovery signal.

Similarly, information fields 920, 922, 924, 926 and 930, 932, 934, 936 are generated from responses received other base stations that also detected the requested discovery expression. The information field 920, 922, 924, 926 and 930, 932, 934, 936 are similar to the corresponding information fields 910, 912, 914, 916 discussed above in detail.

The detecting base station ID field 920 includes an identifier of a second base station that detected the discovery information requested to be monitored in the request message 700. The discovery channel portion ID field 922 includes information identifying the portion, e.g., communications resource(s), of the peer discovery channel on which the discovery information of interest is detected by the second base station identified in field 920. The detected discovery information ID field 924 includes the information identifying the detected discovery information, e.g., service ID 1, detected by the second base station. The signal power information field 926 includes information indicating the received signal power level of the received peer discovery signal communicating the discovery information, measured at the detecting second base station.

The detecting base station ID field 930 includes an identifier of a third base station that detected the discovery information requested to be monitored in the request message 700. The discovery channel portion ID field 932 includes information identifying the portion, e.g., communications resource(s), of the peer discovery channel on which the discovery information of interest is detected by the third base station identified in field 930. The detected discovery information ID field 934 includes the information identifying the detected discovery information, e.g., device ID 2, detected by the third base station. The signal power information field 926 includes information indicating the received signal power level of the received peer discovery signal communicating the discovery information, measured at the detecting third base station.

In accordance with some exemplary embodiments, one exemplary method includes performing the following the following steps:

1. A monitoring UE detects discovery information about a particular application/services announcement from an announcing UE via, e.g., LTE-Direct discovery.

2. The monitoring UE sends a request (snoop REQ) to its serving eNodeB, which include the following information: (a) the specific location in the discovery channel where the announcing UE's service announcements can be found; and (b) the expected "peer-discovery-information" to be announced by the announcing UE in the current and next few discovery cycles. For example, the request could be, and in some embodiments is, a new RRC message defined for LTE system. The serving base station (eNodeB) relays this request with the discovery information of the announcing UE's discovery expression, e.g., application identifier, to various neighboring base stations in the proximity, e.g., via the inter eNodeB X2 interface defined in LTE system.

3. Any eNodeB receiving the request then monitors the discovery channel to detect the expected discovery information.

4. Each of the eNodeBs, if hearing the specified discovery information in the previous step, sends back a response including an SNR measurement, confirming the discovery and reporting the signal strength of discovery signal transmitted by the announcing UE, to the serving eNodeB of the monitoring UE.

5. The serving eNodeB then sends those received SNR measurements to the monitoring UE. The monitoring UE can determine that the announcing UE is still within an area of "proximity" which is covered by the eNodeB(s). In some embodiments, additional location tracking services can be performed. For example, the monitoring UE can pick the one eNodeB with the strongest measurement as a location approximation of the announcing UE. In some embodiments, the monitoring UE can triangulate the position of the announcing UE based on signal strengths reported in the responses from various different eNodeBs.

6. If the monitoring UE wants to reach the announcing UE for a peer-to-peer communication, the monitoring UE then triggers the WAN-assisted paging to reach the announcing peer via the eNodeB close to the announcing UE. This will help to reduce unnecessary usage of paging resources.

In some other embodiments, the location determination is performed by the base station serving the monitoring UE using the received responses including the SNR measurement. In some such embodiments, the serving eNodeB of monitoring UE can determine or approximate the location of announcing UE and convey this information back to the monitoring UE. In this way, the monitoring UE then can still discover the announcing UE in an extended proximity.

In accordance with some other embodiments, an exemplary method includes the following steps:

1. The monitoring UE detects discovery information about a particular application/services announcement from the announcing UE, e.g., via LTE-Direct discovery.

2. The monitoring UE sends a snoop request to various visible base stations in the proximity with sufficient information to detect the announcing UE's application expression announcement.

3. One or more base stations (eNodeBs) receiving the request monitor the discovery channel to detect the expected discovery information.

4. The eNodeBs, if hearing the specified discovery information, send back a response message including an SNR measurement confirming the discovery and reporting the signal strength of discovery signal transmitted by the announcing UE.

5. From the SNR measurements included in the received response messages, the monitoring UE determines that the announcing UE is still within an area of "proximity" which is covered by the eNodeB(s). In some embodiments, the response messages further include location information of the announcing UE determined by the base station sending the response message. In some such embodiments, the monitoring UE uses the location information included in the response message to page the announcing UE via the base station serving the announcing UE.

In accordance with the features of various embodiments, there are a variety of ways to identify the discovery information in the request message based on a trust model, for example:

(i) If the monitoring UE trusts the base stations to which the request is being sent, it can share the original discovery information, e.g., application expressions, with the base station, including necessary plain text, and key information to generate the corresponding discovery information bits and paging identifiers in the peer discovery channel and paging channel.

(ii) If privacy is a concern, the UE can pre-compute corresponding discovery information bits and paging identifiers for a defined time duration (temporal) and use that in the request message being sent to the base stations. In this way, the base stations receiving the request message will only see pseudo-random bit-sequences.

For the above discussion it should be appreciated that numerous variations and embodiments are possible. For example, the methods and apparatus may be applied to LTE embodiments.

In accordance with exemplary embodiment a first communications device, e.g., wireless terminal, can request peer to peer communications discovery assistance from one or more base stations. The request may be sent to a serving base station (eNodeB) serving the wireless terminal or may be sent to a plurality of neighboring base stations in the range of the wireless terminal. In some embodiments the peer to peer communications discovery assistance request includes information identifying peer to peer communications discovery information the wireless terminal is seeking to detect, e.g., discovery information announced by a second communications device. The first communications device sending the request to base stations for monitoring the discovery information is also referred to as the monitoring UE (user equipment) and the second communications device that announced, e.g., broadcasted, the discovery information is also referred to as the announcing UE. In some embodiments, the request is sent from the wireless terminal to the serving base station via a wide area network uplink communications channel. Thus, in various embodiments the first communications device, e.g., the monitoring UE, can request assistance from an eNodeB to enhance expression monitoring capability. This approach does not cause extra transmissions in the common discovery channel and limits the involvement of an announcing peer that is transmitting the peer to peer discovery information.

Various features of the exemplary embodiments optimize LTE-Direct by improving the reliability of discovery in extending the monitoring function from the UE to include surrounding base stations (eNodeB's), as well. Thus, in accordance with one feature of some embodiments, nearby eNodeBs snoop (listen to) the common discovery channel upon the monitoring UE's request. In this way, one or more base stations (eNodeBs) close to the announcing UE may be able to discover the announcing UE that transmitted the peer to peer discovery information. In accordance with one feature of some embodiments, the base stations detecting the specified discovery information send a response indicating the detection of said peer to peer communications discovery information to the monitoring UE and/or the base station serving the monitoring UE.

The monitoring UE can invoke this procedure one or multiple times to keep tracking the discovery of, e.g., a device, an application expression, a service expression, etc., from an announcing UE, even when the announcing UE is out of the direct discovery range of the monitoring UE. In some embodiments the first communications device can use the information received in response to the request from one or more base stations, to improve location accuracy of its peers, e.g., by the peer discovery (PD) signal strength measured and reported by the base stations in the response message. Various features of the exemplary embodiments may also reduce the peer-to-peer communication setup time e.g., by determining based on the response, the particular base station through which the first communication device can reach the announcing UE.

The techniques of various embodiments may be implemented using software, hardware and/or a combination of software and hardware. Various embodiments are directed to apparatus, e.g., mobile nodes such as mobile wireless terminals, base stations, communications system. Various embodiments are also directed to methods, e.g., method of controlling and/or operating a communications device, e.g., a wireless terminals, base stations and/or communications systems. Various embodiments are also directed to non-transitory machine, e.g., computer, readable medium, e.g., ROM, RAM, CDs, hard discs, etc., which include machine readable instructions for controlling a machine to implement one or more steps of a method.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

In various embodiments, nodes described herein are implemented using one or more modules to perform the steps corresponding to one or more methods, for example, signal generation, processing, receiving and/or transmitting steps. Thus, in some embodiments various features are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, various embodiments are directed to a machine-readable medium e.g., a non-transitory computer readable medium, including machine executable instructions for causing a machine, e.g., processor and associated hardware, to perform one or more of the steps of the above-described method(s). Some embodiments are directed to a device, e.g., communications node, including a processor configured to implement one, multiple, or all of the steps of one or more methods of the invention.

In some embodiments, the processor or processors, e.g., CPUs, of one or more devices, e.g., communications devices such as wireless terminals (UEs), and/or access nodes, are configured to perform the steps of the methods described as being performed by the communications nodes. The configuration of the processor may be achieved by using one or more modules, e.g., software modules, to control processor configuration and/or by including hardware in the processor, e.g., hardware modules, to perform the recited steps and/or control processor configuration. Accordingly, some but not all embodiments are directed to a communications device, e.g., user equipment, with a processor which includes a module corresponding to each of the steps of the various described methods performed by the device in which the processor is included. In some but not all embodiments a communications device includes a module corresponding to each of the steps of the various described methods performed by the device in which the processor is included. The modules may be implemented purely in hardware, e.g., as circuits, or may be implemented using software and/or hardware or a combination of software and hardware.

Some embodiments are directed to a computer program product comprising a computer-readable medium comprising code for causing a computer, or multiple computers, to implement various functions, steps, acts and/or operations, e.g. one or more steps described above. Depending on the embodiment, the computer program product can, and sometimes does, include different code for each step to be performed. Thus, the computer program product may, and sometimes does, include code for each individual step of a method, e.g., a method of operating a communications device, e.g., a wireless terminal or node. The code may be in the form of machine, e.g., computer, executable instructions stored on a computer-readable medium such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device or other device described in the present application.

While described in the context of an OFDM system, at least some of the methods and apparatus of various embodiments are applicable to a wide range of communications systems including many non-OFDM and/or non-cellular systems.

Numerous additional variations on the methods and apparatus of the various embodiments described above will be apparent to those skilled in the art in view of the above description. Such variations are to be considered within the scope. The methods and apparatus may be, and in various embodiments are, used with CDMA, orthogonal frequency division multiplexing (OFDM), and/or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods.

What is claimed is:

1. A method of operating a first wireless terminal, comprising:
sending a request via a wide area network uplink communications channel to a first base station requesting peer to peer communications discovery assistance, said request including information identifying peer to peer communications discovery information the first wireless terminal is seeking to detect and information indicating a portion of a discovery channel which is to be monitored for the peer to peer communications discovery information;
receiving, via a wide area network downlink communications channel, from a second base station which is a different base station from said first base station and which received said request from the first base station, a response to said request indicating the detection of said peer to peer communications discovery information; and
sending a signal to initiate paging of a second wireless terminal by the second base station which indicated detection of said peer to peer communication discovery information.

2. The method of claim 1, wherein said response includes location information corresponding to a second wireless terminal, said location indicating a location of the second wireless terminal as determined by an infrastructure element.

3. The method of claim 2, wherein said request further includes information identifying said first wireless terminal, said information including a device identifier which can be used in sending a response to said first wireless terminal.

4. The method of claim 2, wherein said peer to peer communications discovery information is one of peer device discovery information and service discovery information.

5. The method of claim 1, wherein said second base station is a base station that communicates with the first wireless terminal via said first base station.

6. The method of claim 2,
wherein the response further includes signal strength information indicating the strength of a detected discovery signal communicating the peer to peer communications discovery information and identifying a base station which detected the peer to peer communications discovery information.

7. The method of claim 6, further comprising:
determining, from the received response an approximate location of said second wireless terminal which transmitted the detected discovery signal communicating the peer to peer communications discovery information.

8. The method of claim 7,
wherein the first and second wireless terminals support direct device to device communication; and
wherein sending the signal to initiate paging of said second wireless terminal by the second base station includes:
sending the signal to initiate paging of the second wireless terminal to the first base station to initiate a base station assisted paging operation.

9. A first wireless terminal, comprising:
means for sending a request via a wide area network uplink communications channel to a first base station requesting peer to peer communications discovery assistance, said request including information identifying peer to peer communications discovery information the first wireless terminal is seeking to detect and information indicating a portion of a discovery channel which is to be monitored for the peer to peer communications discovery information;
means for receiving, via a wide area network downlink communications channel, from a second base station which is a different base station from said first base station and which received said request from the first base station, a response to said request indicating the detection of said peer to peer communications discovery information; and
means for sending a signal to initiate paging of a second wireless terminal by the second base station which indicated detecting said peer to peer communications discovery information.

10. The first wireless terminal of claim 9, further comprising:
means for generating said request, and
wherein said response includes location information corresponding to a second wireless terminal, said location information indicating a location of the second wireless terminal as determined by an infrastructure element.

11. The first wireless terminal of claim 10, wherein said means for generating said request further include means for including, in said request, information identifying said first wireless terminal, said information including a device identifier which can be used in sending a response to said first wireless terminal.

12. The first wireless terminal of claim 9, wherein said second base station is a base station that communicates with the first wireless terminal via said first base station.

13. The first wireless terminal of claim 10,
wherein the response further includes signal strength information indicating the strength of a detected discovery signal communicating the peer to peer communications discovery information and identifying a base station which detected the peer to peer communications discovery information.

14. The first wireless terminal of claim 13, further comprising:
means for determining, from the received response, an approximate location of said second wireless terminal which transmitted the detected discovery signal communicating the peer to peer communications discovery information.

15. The first wireless terminal of claim 14, wherein the first and second wireless terminals support direct device to device communication, and wherein said means for sending a signal to initiate paging of said second wireless terminal by the responding second base station sends said signal to the first base station to initiate a base station assisted paging operation.

16. A first wireless terminal, comprising:
at least one processor configured to:
send a request via a wide area network uplink communications channel to a first base station requesting peer to peer communications discovery assistance, said request including information identifying peer to peer communications discovery information the first wireless terminal is seeking to detect and information indicating a portion of a discovery channel which is to be monitored for the peer to peer communications discovery information;
receive, via a wide area network downlink communications channel, from a second base station which is a different base station from said first base station and which received said request from the first base station, a response to said request indicating the detection of said peer to peer communications discovery information; and
send a signal to initiate paging of a second wireless terminal by the second base station which indicated detecting said peer to peer communications discovery information; and
a memory coupled to said at least one processor.

17. The first wireless terminal of claim 16,
wherein the response further includes signal strength information indicating the strength of a detected discovery signal communicating the peer to peer communications discovery information and identifying a base station which detected the peer to peer communications discovery information.

18. The first wireless terminal of claim 17, wherein said at least one processor is further configured to:
determine, from the received response, an approximate location of said second wireless terminal which transmitted the detected discovery signal communicating the peer to peer communications discovery information.

19. The first wireless terminal of claim 18, wherein the first and second wireless terminals support direct device to device communication, and wherein said at least one processor is further configured to:
send said signal to initiate paging of said second wireless terminal to the first base station to initiate a base station assisted paging operation, as part of being configured to send the signal to initiate paging of said second wireless terminal by the second base station.

20. A computer program product for use in a first wireless terminal, comprising:
a non-transitory computer readable medium comprising:
code for causing at least one computer to send a request via a wide area network uplink communications channel to a first base station requesting peer to peer communications discovery assistance, said request including information identifying peer to peer communications discovery information the first wireless terminal is seeking to detect and information indicating a portion of a discovery channel which is to be monitored for the peer to peer communications discovery information;

code for causing the at least one computer to receive, via a wide area network downlink communications channel, from a second base station which is a different base station from said first base station and which received said request from the first base station, a response to said request indicating the detection of said peer to peer communications discovery information; and code for causing the at least one computer to send a signal to initiate paging of a second wireless terminal by the second base station which indicated detecting said peer to peer communications discovery information.

* * * * *